United States Patent [19]
Nelson

[11] Patent Number: 6,112,199
[45] Date of Patent: Aug. 29, 2000

[54] DATA ITEM VALUES

[76] Inventor: Paul M. Nelson, 14384 La Harina Ct., San Diego, Calif. 92129-4201

[21] Appl. No.: 08/734,049

[22] Filed: Oct. 18, 1996

Related U.S. Application Data

[60] Provisional application No. 60/005,572, Oct. 18, 1995.

[51] Int. Cl.[7] .................................................. G06F 17/30
[52] U.S. Cl. ........................................ 707/4; 707/2; 707/3
[58] Field of Search ......................... 707/1–10, 100–106, 707/200–204; 364/525, 200, 900, 600

[56] References Cited

U.S. PATENT DOCUMENTS

| | | | |
|---|---|---|---|
| 4,498,145 | 2/1985 | Baker et al. | 364/900 |
| 4,868,733 | 9/1989 | Fujisawa et al. | 707/5 |
| 4,885,705 | 12/1989 | Choi | 364/525 |
| 4,918,593 | 4/1990 | Huber | 364/200 |
| 4,939,689 | 7/1990 | Davis et al. | 364/900 |
| 5,097,408 | 3/1992 | Huber | 395/600 |
| 5,201,046 | 4/1993 | Goldberg et al. | 395/600 |
| 5,276,870 | 1/1994 | Shan et al. | 395/600 |
| 5,369,761 | 11/1994 | Conley et al. | 395/600 |
| 5,471,629 | 11/1995 | Risch | 707/201 |
| 5,548,749 | 8/1996 | Kroenke et al. | 707/102 |
| 5,603,021 | 2/1997 | Spencer et al. | 707/4 |

*Primary Examiner*—Ruay Lian Ho
*Attorney, Agent, or Firm*—Fitch, Even, Tabin & Flannery

[57] ABSTRACT

An improved method for value derivation allows for the definition of derived and defaulted information as database table columns. Derivation formulas are defined independently to the database management system. A derivation formula is assigned to each derived or defaulted column during their definition. Derivation formula parameter value assignments are also defined for each derived or defaulted column, if required by the derivation formula associated with the column. In addition, a derivation type is assigned to each derived or defaulted column specifying the conditions under which the value of the column is to be derived. During key processes, such as while inserting a row into a database or retrieving a row from a database, the database management system will determine whether a value is to be derived for each affected column. The database management system makes this determination through the examination of the derivation type associated with the column. If the database management system determines that the value for a derived or defaulted column is to be derived, it automatically invokes the derivation formula assigned to the column using any derivation parameter value assignments specified in the column definition. The database management system will then assume the values resulting from the derivation formula as the values of the derived or defaulted column.

23 Claims, 13 Drawing Sheets

DATA ITEM VALUES

This patent document is a Non-Provisional patent document filed in accordance with 35 U.S.C § 111(a) and entitled to priority under 35 U.S.C. § 119(e) to Provisional Patent Application No. 60/005,572, of Nelson, for VALUE DERIVATION PROCESS FOR RELATIONAL DATABASE TABLE COLUMNS, filed Oct. 18, 1995 in accordance with 35 U.S.C § 111(b), and hereby incorporated by reference.

A portion of the disclosure of this patent document contains material that is subject to copyright protection. The copyright owner has no objection to the facsimile reproduction by anyone of this patent document or the patent disclosure as it appears in the United States Patent and Trademark Office patent files or records, but otherwise reserves all copyright rights whatsoever.

BACKGROUND

The present invention relates to database management systems (DBMS). More specifically, the present invention relates to an approach for automatic derivation of database data item values.

DESCRIPTION OF PRIOR ART

Computer-based database management systems are designed to provide for the storage and manipulation of information in a highly organized and efficient manner. Databases containing such information are typically stored and manipulated in memory devices such as random access memories, magnetic media, e.g., floppy disks, hard disks and magnetic tapes. Most databases are organized as relational databases. Relational databases are based on an application of mathematical set theory to the storage of information in such databases, as formally introduced by Dr. E. F. Codd in 1970. While the invention described herein is useful in relational database applications, the skilled artisan will appreciate its application to a wide array of database environments, not limited to relational databases.

Relational databases are typically organized into tables that represent groups of preferably related pieces of information. In accordance with two-dimensional grouping methodology, each category of information in a table is referred to as a table column. For each table, multiple rows can be created. Each row contains a set of related pieces of information, each corresponding to a different table column.

For example, if a company retains information in a relational database for each of its departments and employees that work in each of such departments, two tables may be created within the relational database, one to house information about the departments and the other to house information about the employees. The "departments" table may contain table columns such as "department identifier", "department name" and "department location". The "employees" table may contain table columns such as "employee identifier", "name", "department identifier", "work location", "hire date", "termination date" and "years of service". Thus, the relational database for the present example may be represented as follows:

| Department Table | Employee Table |
| --- | --- |
| Department ID Column | Employee ID Column |
| Name Column | Name Column |
| Location Column | Department ID Column |
| Employee Name Column | Location Column |
| | Hire Date Column |
| | Termination Date Column |
| | Years of Service Column |

Rows are inserted into the Department Table as pieces of information are added to the database related to each department in the company. Similarly, rows are created in the Employee Table as pieces of information are added to the database related to each employee. Space is maintained in a memory device for each column of every row by the database management system.

Two of the columns in the Employee Table and one of the columns in the Department Table could be considered derived columns, i.e., pieces of information that can be computed or determined using other pieces of information already in the database. For example, the Employee Name column of the Department Table can be derived by comparing the Department ID information in the Department ID column of the Department Table to the information in the Department ID column of the Employee Table and retrieving the information in the Name column of the Employee Table for rows for which the information in the Department ID column of the Department Table matches the information in the Department ID column of the Employee Table. Similarly, the Location column of the Employee Table can be derived by matching the Department ID column of the Employee Table with the Department ID column of the Department Table and retrieving information from the Location column of the Department Table for rows in which the information in the two Department ID column match. In addition, the Years of Service column of the Employee Table can be derived by subtracting the piece of information in the Hire Date column from the piece of information in the Termination Date column, or, if there is no piece of information in the Termination Date column (because the subject employee has not yet terminated employment) the current date, i.e., today's date.

The existence of derived pieces of information in a database poses serious data accuracy problems. To ensure consistency, processes must be created which update the values of derived data items whenever the values from which they are derived are changed. For example, if the piece of information in the Termination Date column for an employee is modified, the value of the Length of Service column must be modified accordingly to keep the two related fields in synch. Steps must also be taken to assure that the values of derived data items are not directly modified so as to render them inaccurate. For example, if an end-user were allowed to directly modify the value of the Length of Service column for an employee, it may become invalid.

Heretofore, normalization has been the accepted methodology for designing relational databases and addresses these problems. Under the rules of normalization, each individual piece of information is stored in only one place in the database, thus assuring that information does not exist redundantly in a database, and removing the need to synchronize the values of redundant information. For example, normalization would require that the Employee Name column be removed from the Employee Table in the database in deference to the same column in the Department Table.

The Years of Service column of the Employee Table would also be removed and value derived as described above.

Although normalization removes the potential data accuracy problems associated with derived columns, normalization also introduces a few serious problems. For example, the formulas used to calculate the values of derived information must be included in each request that requires the derived piece of information. The possibility of errors in the derivation formulas is therefore significant, and is aggravated by the fact that inexperienced users are required to include the derivation formulas in their requests. This possibility of errors is of course increased, as the complexity of the derivation formulas increases. In addition, if a derivation formula is ever changed, every request that includes it must also be modified.

Several methods have been developed that address some of the problems described above in dealing with derived columns as well as other problems. None of the methods developed heretofore however address all of the known problems, and in some cases introduce additional problems.

One of the approaches to solving some of the above problems is a "stored procedure". The "stored procedure" is a piece of programming logic stored and maintained by the database management system. Each stored procedure performs a specific task or set of tasks. Some database management systems, such as those sold under the trade names ORACLE and ILLUSTRA allow the creation of a specific type of stored procedure, referred to as a "user-defined function", that can accept input parameters and return the result of its operation. Stored procedures can be used to centrally define derivation formulas to the database management system thus avoiding the derivation formula redundancy problems described earlier. Complications arise however, concerning the invocation and execution of stored procedures. Generally, stored procedures are invoked by an end-user. In order to use stored procedures, end-users must be aware of their existence and the specific derivation formula contained in each. End-users must also be cognizant of, and include, the appropriate input parameters required by each stored procedure for it to operate properly.

Another approach, referred to as a "defaulted data item" is a special type of derived data item for which the derivation formula is only required in the event that a value has not been provided by the user. The result of the derivation formula is accepted as the value of a defaulted data item. For example, if an employee's location in the example presented earlier is the same as the location of the department in which the employee works in most cases, but an employee could have a location that is different than the location of the department in which they work. The Location column of the Employee Table could be "initially defaulted" based upon the value of the Location column of the Department table in which an employee works. When a row is initially inserted into the Employee Table and the value has not been provided for the Location column, the derivation formula would be invoked through some means. The derivation formula would retrieve the value of the Location column of the department in which the new employee works and the result of the derivation formula would be accepted as the value of the piece of information in the Location column of the Employee Table and would be placed in database storage for it. If the derived column is "initially defaulted", the piece of information can be altered by the user without constraint to the derived value.

A "multiple value data item" is another special type of derived data item for which present methodologies are unsatisfactory. A multiple value data item exists when the execution of a derivation formula is capable of producing a set of results instead of just a single result. The Employee Name column in the Department Table in the foregoing example is an example of a multiple value data item. The derivation formula, in this case, would retrieve the names of all of the employees from the Employee Table who work in the specified department. There are a limited number of methods that allow multiple value data items to be represented in current database management systems and disadvantageously, none of these implementations allow the multiple value data item to appear in an existing database table where they would be most readily accessible to the database users.

Another of the methods by which derived data items may be used is referred to as denormalization. Using this methodology, normalization is compromised by including derived columns as additional columns in a database to store the value of the derived formula. Denormalization requires that database storage space be used unnecessarily because the derived pieces of information must be maintained in the memory allocated to the database. Inherent with denormalization is the data accuracy problems described earlier.

U.S. Pat. No. 5,369,761 to Conley et al. (1994) discloses a method of denormalization by which the values of derived columns are automatically maintained by a database management system. This method does eliminate the necessity to create processes that maintain the values of derived columns when the values of the columns on which they are based are changed. It does not, however, automatically protect the values of the derived columns from direct modification. Nor does it allow for derivation formulas such as that required in the Years of Service column described in the above-presented example. (This is because the Conley, et al., approach does not allow for the use of formulas of any kind.) The Conley approach cannot be used to implement initially defaulted or continuously defaulted derived columns.

U.S. Pat. No. 4,918,593 to Huber (1990) discloses a different method of denormalization by which the values of derived columns are automatically maintained. The Huber patent recognizes an additional type of derived value referred to as an "aggregate field" but still does not accommodate the many types of complex derivation formulas that may exist, such as that required in the Years of Service column described in the above-presented example. The Huber approach, however, does not provide for implementation of initially defaulted or continuously defaulted derived columns.

Similar to the Conley et al. and Huber patents, maintenance of denormalized columns may also be performed in processes called "triggers" that are directly associated with database tables. Triggers can be programmed to automatically respond to changes in column values by updating derived columns that may be based on the changed values. Unlike the method disclosed in the Conley et al. and Huber patents, more complex derivation formulas may be included in triggers. Extensive analysis must be performed however, in order to create trigger processes that effectively maintain denormalized columns. In addition, the derivation formulas embedded into trigger processes may only be invoked through the update of the table with which they are associated. Derived values dependent upon variables that are available to the database management system but are not specifically included in a database definition cannot be accommodated through the use of triggers. An example of this can be seen in the use of the current system date variable in the derivation formula for the Years of Service column.

Nor do triggers automatically protect the values of derived columns from direct modification. Triggers can be used to initially default pieces of information in column tables, but cannot support continuous defaulting.

In many cases, maintenance of denormalized column values, using the approaches described above (i.e., Conley, et al., Huber and Triggers) as well as other approaches, interferes with normal database activity and must be delayed. In these instances, the values of the de-normalized columns are inaccurate until such maintenance is performed.

Another method of accommodating derived information is referred to herein as an "embedded formula" approach. There are two different subtypes of the embedded formula approach: the first allows derivation formula text to be embedded into the definition of a derived column that has been defined to a table; the second allows derivation formula text to be embedded into the stored values of a derived column. The first subtype is used primarily for the purpose of defaulting column values. A derivation formula stored in accordance with the second is executed when the value of the derived column is requested. Because derivation formulas are redundantly created in all embedded formula techniques, these implementations are subject to the derivation formula redundancy problems described earlier.

Simple defaulting scenarios can also be implemented in most database management systems by the specification of a "column default value". A column default value is an extremely simple derivation formula which can be included in the definition of a table column. In most cases, only a single constant default value is permitted. In the event that a row is inserted into a table and no value has been specified for the defaulted column, the derivation formula text is executed and the result is placed in database storage for the column. The allowable column default value derivation formula text is extremely limited and may only be used to implement simple defaulting scenarios. Column default values cannot be used to support continuous default scenarios. Nor can fully-derived data items or multiple value data items be accommodated through the use of column default values.

Although not considered database management systems, some computerized spreadsheet software such as Microsoft Excel and Lotus 1-2-3 allow the user to embed a derivation formula into the value of a "cell". A cell is the spreadsheet equivalent of a single piece of information in a database table. Whenever any changes occur to a spreadsheet, all embedded derivation formulas are executed to recalculate the derived pieces of information in the spreadsheet. Only simple derivation formulas can be embedded into a cell and the derivation formulas in spreadsheets must be redundantly defined each time that a formula is required. This technique cannot be used to initially or continuously default the values, nor can this technique accommodate multiple value data items.

A method proposed by Michael Stonebraker of the University of California for handling derived information, termed "procedural data types", allows the text of a derivation formula to be stored as the value of a derived column. Using this approach, when a request is received for the value of a derived column, the database management system retrieves the derivation formula from storage for the derived column and returns it to the requester. The requester may then execute the retrieved stored procedure to arrive at a derived value for the data item. This approach can be used to implement multiple value data items. In addition, it is capable of utilizing stored procedures. This approach, however, requires that a great deal of database storage space be used unnecessarily. In addition, this approach is incapable of accommodating defaults of any kind.

Another method of accommodating derived information is referred to in this application as the "table extensions" approach. This approach allows a new entity to be physically or conceptually created in which derived data items can be generated from existing database tables. All of the implementations of this approach are capable of accommodating multiple value data items. Using the table extensions approach, however, the derivation formula is embedded into the database language used to create the table extension. As such, this approach is generally limited by the database language so as to make it difficult, if not impossible, to include complex derivations. Table extensions do not allow derived data items to be integrated into existing database tables where they would be most readily available to database users. This approach does not accommodate defaults of any kind.

One type of table extension that is available in virtually every major database management system is the "viewed table" or "view". A view contains a pre-defined database request which may include derivation formulas. Although this method does reduce the number of times that a derivation formula must be repeated, it does not remove derivation formula redundancy completely. A derivation formula must be repeated in every view that includes a specific derived data item. In order to use derived data items included in views, users must be aware of the different views that are available and which derived columns can be retrieved using each. In addition, views do not adequately accommodate complex derived values such as the Years of Service column from the foregoing example. Although this kind of derived formula (which utilizes conditional logic) can be included in a view, the method by which it is accommodated is cumbersome requiring the merger of two separate requests through the use of a "UNION" statement. The inclusion of more than one of these complex derived values increases the number of requests merged in the view exponentially.

Similar to views, some database management systems such as Oracle, allow new tables to be created from existing tables. As in views, a single request is used to generate new "inherited tables" from their pre-existing counterparts. As such, inherited tables are subject to the same restrictions as views.

In yet another approach, a method of table extension has been introduced by Hugh Darwen and C. J. Date, known as "relation-valued attributes". This technique proposes that an "EXTEND" command be employed during the execution of a database request to extend database tables. Additional derived data items may be included in the table extension. The new data items are conceptual, however, and are not actually added to the original database table. The "EXTEND" command is an addition to the relational operators used in database requests. In order to use this approach, database users must know how to include the "EXTEND" operator in their requests, specify the derivation formula, and include any input parameters required by the derivation formula.

The last category of existing methods of accommodating derived information is referred to in this document as the "external agent" approach. Utilizing this approach, entities external to derived data items and derivation formulas are introduced that accommodate derived data items among other functions. Each type of external agent has its own specific problems in regard to the derivation of data item values.

"Active database rules" are a powerful agent that has been implemented in several of the more advanced database management systems such as Postgres and Illustra. Active database rules are similar to the triggers discussed earlier in that they respond to database events. Active database rules are capable of responding to a much broader range of events than are triggers, and unlike triggers, can react to events related to specific table columns. Active database rules can be used to implement derived data items, initial defaults and continuous defaults. However, active database rules do have a few serious problems related to derived data items. Database storage space must be used unnecessarily for fully-derived columns, as implemented in the active database rule approach. An active database rule also represents an unnecessary third entity between the derived data item and its derivation formula unnecessarily complicating the implementation of derived data items. Active database rules are also unable to accommodate multiple value data items.

Another type of external agent which can be used to implement derived data items is called "abstract data types" or "extensible data types". This methodology has been implemented in the Postgres and Illustra database management systems and is included in the ANSI/ISO SQL3 standard (a draft of which is due to be released in January of 1997). Using abstract data types, a user may define new data types from which column definitions can then be created. Abstract data types were primarily introduced to handle unconventional types of data such as, shapes, sounds, pictures, etc. While defining a new data type, the user may specify a function which is to be executed whenever the value of any column of that data type is retrieved. An abstract data type may also be defined as a "virtual" data type. Columns created from a virtual data type do not require database storage space and rely upon the function specified at the data type level to derive their values. Problems arise, however, because derivation formulas may only be associated at the data type level and cannot be associated at the table column level. A virtual data type with an associated function must be created for each derived column regardless of whether a data type is required or appropriate. As an example, to implement the YEARS OF SERVICE column, a new data type must be created which is associated with the derivation formula. Furthermore, abstract data types do not adequately accommodate the specification if input parameters are to be used with their associated functions. Abstract data types are prone to derivation formula redundancy since a derivation formula must be repeated for each instance in a database. Abstract data types are incapable of accommodating multiple value data items.

The above and other problems are addressed by the invention described hereinbelow.

SUMMARY OF THE INVENTION

Accordingly, several features and advantages of the present invention in various embodiments are to provide a data value derivation process that allows a database management system to support all types of automatically derived data items (e.g., fully derived initially defaulted, continuously defaulted and multiple value data items), that allows all types of derived data items to be integrated into existing database tables where they will be most accessible to database users, that allows all derived data items values to reflect the most recent versions of derivation formulas and input data, that does not require that special processes be created to maintain the values of fully-derived or multiple value data items that prevent the corruption of fully-derived or multiple value data items by direct modification, that allows derivation formulas to be associated directly with the derived data items, that does not require the introduction of a third entity to associate derived data items with their derivation formulas, that allows for the specification of derivation formula input parameter assignment values, that allows derivation formulas to be defined efficiently as stored procedures, that eliminates the necessity for formula derivation redundancy, that minimizes errors caused by the redundant definition of derivation formulas, that minimizes the effort required to modify derivation formulas, that allows the use of derivation formulas of any level of complexity, that minimizes database management system language restrictions on the definition of derivation formulas, that allows derivation formulas to be executed directly by database users for purposes other than data item derivation, that does not require that derivation formulas be included in database requests, and that allows derivations to be performed automatically by the database management system without any special knowledge of derivation formulas or their required input parameters and end-users.

Further features and advantages of various embodiments of the present invention are to provide a data item derivation process that allows derived pieces of information to be referenced in exactly the same manner as non-derived pieces of information, that allows for the creation of tables made up entirely of derived pieces of information, that allows separate derivation formulas to be merged by the database management system during request execution in order to maximize processing efficiency, and that allows for minimization of the database language required in database request.

These features and advantages are accomplished in various embodiments of the present invention using a processor and a memory device wherein user-created derivation formulas are be defined to a database management system independently of other database entities, such as tables, columns, triggers, rules, data types, etc. Preferably, a derivation formula is specified for each derived or defaulted data item during column definition. A derivation type is also assigned for each data item during data item definition. The database management system examines the derivation type during the insert and retrieval processes to determine whether the derivation formula associated with the data item is to be invoked.

Still further features and advantages will become apparent from a consideration of the ensuing description and drawings.

DRAWING FIGURES

The above and other aspects, features and advantages of the present invention will be more apparent from the following more particular description thereof, presented in conjunction with the following drawings wherein.

In the drawings, closely related figures have been designated using the same number, but different alphabetic suffixes. Throughout the specification similar reference numerals have been used to refer to similar items.

DETAILED DESCRIPTION OF THE INVENTION

Figure 1:
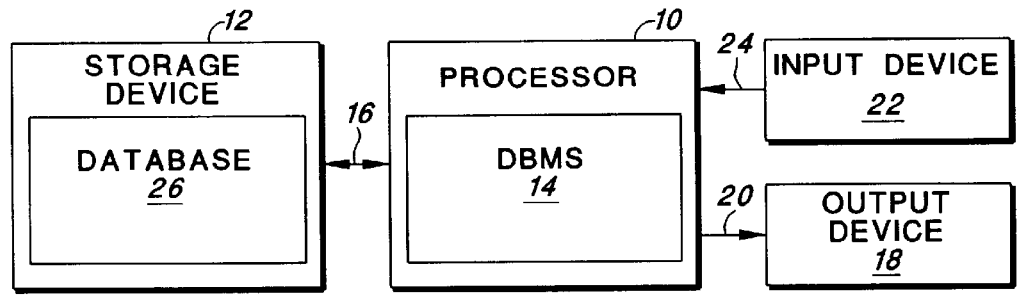
FIG. 1 is a block diagram showing a processor and a memory device in conjunction with a database management system in accordance with one embodiment of the present invention.

A glossary of terms is provided that defines terms that are introduced during the detailed description of the invention.

GLOSSARY

CATALOG DATABASE—A catalog database is used by a database management system to maintain the information that it requires to perform its functions. Information concerning database management system entities such as tables, columns, data types, and stored procedures is maintained in the catalog database. The catalog database is modified in accordance with the preferred embodiment to capture information required to perform automatic derivation functions.

CONTINUOUSLY DEFAULTED COLUMN™—A CONTINUOUSLY DEFAULTED COLUMN™ is a type of derived column and assigned a derivation formula at the time it is defined. Such columns are automatically defaulted at the time the pieces of information contained therein are requested by a user. The value of a CONTINUOUSLY DEFAULTED COLUMN™ is derived at the time that it is requested if a null entry is found in database storage for the column. CONTINUOUSLY DEFAULTED COLUMN™ is a trademark of Paul M. Nelson.

DERIVED COLUMN—A derived column is a table column, the value of which may be determined through the invocation of a derivation formula. Each derived column must have associated with it a derivation type and a derivation formula. Derivation formula parameter values may also be defined for a derived column, if required by the derivation formula associated with it. In accordance with the preferred embodiment there are three types of derived columns: PHANTOM COLUMNS™, initially defaulted columns and continuously defaulted columns. PHANTOM COLUMNS™ is a trademark of Paul M. Nelson.

DERIVATION FORMULA—A derivation formula is a set of instructions that, when invoked, will result in a value or a set of similar values that may be assumed as the value of a derived column. In accordance with the preferred embodiment, derivation formulas are defined as stored procedures or user-defined functions.

DERIVATION FORMULA PARAMETER—A derivation formula parameter is a field that is defined within a derivation formula. Derivation formula parameters are used to pass variable inputs to a derivation formula during its induction. A derivation formula presumably uses the derivation formula parameters associated therewith to calculate its result.

DERIVATION FORMULA PARAMETER ASSIGNMENT VALUE—A derivation formula parameter assignment value is a value that is assigned to a derivation formula parameter during the definition of a derived column. In accordance with the preferred embodiment, the derivation formula parameter assignment value may be a constant, a global value, an expression, or a reference to a table column appearing in the same table as the derived column being defined.

DERIVATION TYPE—A derivation type is an indicator specified at the time the definition of a derived column is made and used to communicate to the database management system the conditions under which a derivation formula is to be invoked for a derived column. In accordance with the preferred embodiment, there are three types of derived columns identified by their derivation types: PHANTOM COLUMNS™, initially defaulted columns, and CONTINUOUSLY DEFAULTED COLUMNS™.

FULLY-DERIVED COLUMN—Also referred to herein as a "PHANTOM COLUMN™", a fully-derived column is a table column whose value is determined by the execution of a derivation formula in all cases. When defined, each fully-derived column is assigned a derivation formula. When a request is received by the database management system for the value of a fully-derived column, it automatically invokes the associated derivation formula. The result of the derivation formula is accepted as the value of the fully-derived column. A fully-derived column may represent a single value or a set of similar values. In the event that the fully-derived column represents a set of values, the column is referred to as a multiple value column.

INITIALLY DEFAULTED COLUMN—An initially defaulted column is a database table column that is automatically defaulted when a new row containing it is inserted into a database table. Each initially defaulted column is assigned a derivation formula when it is defined. If a value has not been specified for an initially defaulted column during an insert, the database management system will automatically invoke the derivation formula associated with it. The result of the derivation formula will be placed in database storage as the value of the initially defaulted column.

MULTIPLE VALUE COLUMN—A multiple value column is a type of PHANTOM COLUMN™ that may represent a set of similar values as opposed to a single value. If, during a database request, the execution of the derivation formula associated with a PHANTOM COLUMN™ results in a set of similar values, each one of the resulting values will be used to create an additional row of the result set. The new rows, known as "PHANTOM ROWS™", are required to allow all of the values in a multiple value column to be returned to the requester. A "multiple value indicator" can be set at the time that the column is defined to indicate whether a PHANTOM COLUMN™ will be capable of representing multiple values.

MULTIPLE VALUE INDICATOR—A multiple value indicator is used during the definition of derivation formulas to identify derivation formulas that may result in a set of similar values as opposed to a single value. The multiple value indicator is also used during definition of PHANTOM COLUMNS™ to identify columns that are capable of representing a set of similar values as opposed to a single value.

NON-DERIVED COLUMN—A non-derived column is a table column, the value of which is not derived automatically by the database management system. Non-derived columns are also referred to herein as standard columns.

PHANTOM COLUMN™—A PHANTOM COLUMN™ is a type of derived column. See fully-derived column above.

PHANTOM ROW™—A PHANTOM ROW™ is a row that appears in the result set of a request that includes multiple value columns. Normally, each column of each row may only have one value and such value is returned to the requester. If a column has multiple values, multiple rows must be returned to the requester, and each row of the result set will contain one of the values of the multiple value column. The term "PHANTOM ROW™" applies exclusively to such rows created as a result of the multiple value column features of the embodiments of the present invention described herein. PHANTOM ROW™ is a trademark of Paul M. Nelson.

PHANTOM TABLE™—A PHANTOM TABLE™ is a database table comprised entirely of PHANTOM COLUMNS™. PHANTOM TABLES™ require no space parameters and cannot have indexes or a primary key defined for them. The term "PHANTOM TABLE™" applies exclusively to tables comprised of PHANTOM COLUMNS™ as disclosed herein. PHANTOM TABLE™ is a trademark of Paul M. Nelson.

PRIMARY KEY—A primary key is the column or set of columns in a database table that may be used to uniquely distinguish between the different rows of the table. No two rows in a database table may have the same piece(s) of information in the column or set of columns defined as the table's.

QUERY REWRITE—A process through which two or more sections of database request language are combined into a single request thereby increasing execution efficiency. In the preferred embodiment, it is proposed that multiple derivation formulas be combined in this manner whenever possible.

STANDARD COLUMN—See "non-derived" column.

STANDARD STORED PROCEDURE—A standard stored procedure is a stored procedure that does not contain a derivation formula and cannot be used to automatically derive columns.

STORED PROCEDURE—A stored procedure is a piece of programming logic that is stored and maintained by a database management system. Each stored procedure performs a predefined task or set of tasks. Stored procedures may be used to capture derivation formulas within a database management system.

USER DATA TYPE—User data types are extensions to system-supplied data types such as "CHARACTER", "INTEGER", "BIT", and "DECIMAL", and are defined by database administrators. User data types are more specific than system-supplied data types and allow associations with such elements as edit procedures, input procedures and output procedures. During the creation of table columns, user data types may be referenced in the same manner as system-supplied data types to allow new columns to inherent the characteristics of a user-defined data type. In the preferred embodiment, derivation characteristics can be inherited by table columns from user-defined data types.

USER-DEFINED FUNCTION—A user-defined function is a special type of stored procedure, that can accept input parameters and return the result of its operation. User-defined functions are especially well suited for the capture of derivation formulas.

VIEW DECOMPOSITION—See "Query rewrite".

DERIVATION PROCESS OVERVIEW

Referring to FIG. 1, a block diagram is shown of a processor 10 and storage device 12 in combination with the database management system 14 in accordance with one embodiment of the invention. The processor 10 is coupled to the storage device 12 via an appropriate data channel 16, and is coupled to an output device 18 through an output channel 20, and to an input device 22 through an input channel 24. A database 26 resides on the storage device 12 and is accessed by the processor 10 under control of the database management system 14. Database queries and information requests submitted to the processor 10 via the input device 22 and input channel 24, are processed by the database management system 14, which accesses the database 26 in accordance with the teachings of the present invention, and output is generated and sent via the output channel 20 to the output device 18.

The database management system 14 of FIG. 1 is similar to heretofore known database management systems except that it includes features of the present embodiment, as described hereinbelow in reference to FIGS. 2 through 12B. Similarly, the storage device 12, input device 22, and output device 18 may be of conventional design, as may be the processor. The database 26, of course, contains information relevant to and in accordance with the application to which the present embodiment is applied.

Figure 2:
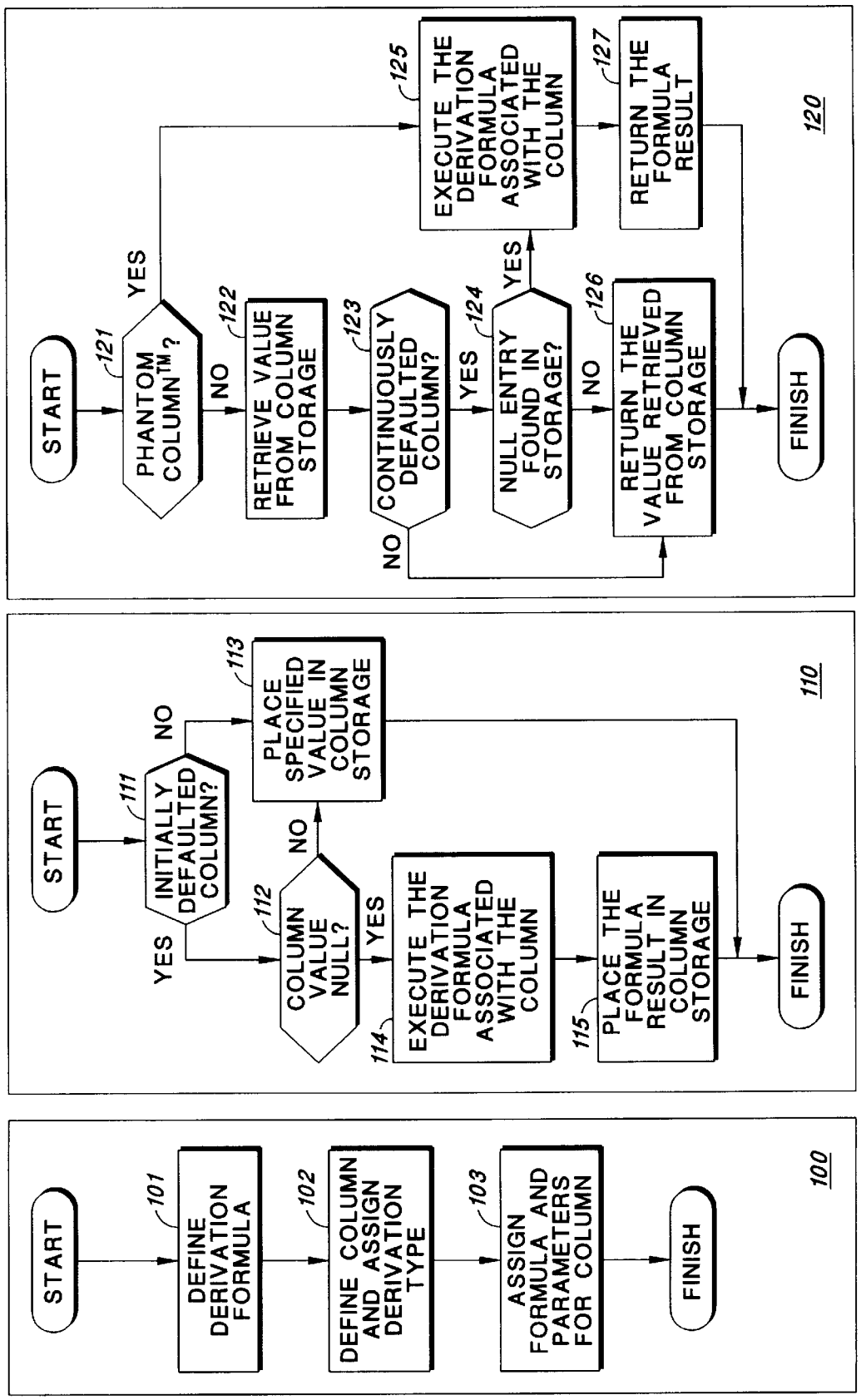
FIG. 2 is a flowchart showing an overview of the column value derivation process, in accordance with a preferred embodiment.

Referring to FIG. 2, an overview of the value derivation process is shown in flowchart form. The derivation process disclosed in the present invention can be summarized as three major processes executing in the database management system.

The definition Process 100 maintains derivation information in the database management system catalog database. The Insert Process 110 uses the derivation information stored in the database management system catalog database and derives values to be placed in system storage for initially defaulted columns when appropriate. The Retrieval Process 120 accesses the information stored in the database management system catalog database and derives values to be returned to the requester for PHANTOM COLUMNS™ and CONTINUOUSLY DEFAULTED COLUMNS™ when appropriate.

In the Definition process 100, a derivation formula is defined as a stored procedure or user-defined function in block 101. A derived column is defined in block 102. During the derived column definition in block 102, a derivation type is assigned to the derived column to indicate to the database management system the circumstances under which the column value should be derived. The derivation formula is assigned to the derived column in block 103. Values are also assigned for parameters required by the derivation formula in block 103.

The Insert Process 110 determines whether the column is to be derived prior to placing the column value into database storage during the execution of an "INSERT" command. Condition 111 examines the derivation type of the column and determines whether it is an initially defaulted column. If so, control passes to condition 112 which determines whether the value of the column in the row to be inserted is a null entry. If this is the case, control passes to block 114 which executes the derivation formula assigned to the column using any parameter assignment values specified in the column definition. Block 115 then places the result returned from the derivation formula into database storage as the value of the initially defaulted column in the newly inserted row. If condition 112 determines that the value of the initially defaulted column in the row to be inserted is not a null entry, control is passed to block 113. Block 113 then places the value specified into database storage as the value of the initially defaulted column in the newly inserted row. If condition 111 determines that the column is not an initially defaulted column, control will be passed to block 113. Block 113 then places the value specified into database storage as the value of the column in the newly inserted row.

The Retrieval Process 120 determines whether the column is to be derived prior to returning the value to the requester during the execution of a request which retrieves a column value. Condition 121 examines the derivation type of the column definition and determines whether it is a PHANTOM COLUMN™. If so, control passes to block 125 which executes the derivation formula assigned to the column using any parameter assignment values specified in the column definition. The result of the derivation formula is returned to the requester as the value of the PHANTOM COLUMN™ in block 127. If condition 121 determines that the column is not a PHANTOM COLUMN™, control passes to block 122 which retrieves the column value from database storage. Condition 123 then examines the derivation type of the column definition and determines whether it is a CONTINUOUSLY DEFAULTED COLUMN™. If so, control is passed to condition 124, which examines the column value returned from database storage in block 122. If the column value is a null entry, control is passed to block 125, which executes the derivation formula assigned to the column using any parameter assignment values specified in the column definition. The result of the derivation formula is then returned to the requester as the value of the CONTINUOUSLY DEFAULTED COLUMN™ in block 127. If condition 124 determines that the column value retrieved from database storage in block 122 is not a null entry, the retrieved value is then passed to the requester as the value of the CONTINUOUSLY DEFAULTED COLUMN™ in block 126. If condition 123 determines that the column is not a CONTINUOUSLY DEFAULTED COLUMN™, control is passed to block 126 which returns the column value retrieved in block 122 to the requester.

DBMS Catalog Table Additions

Figure 3:
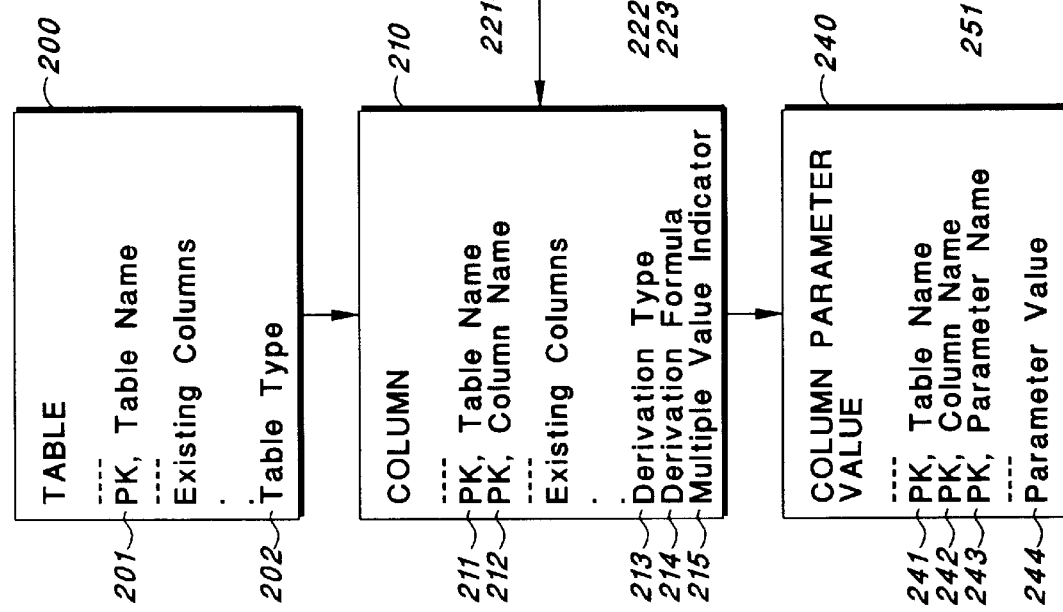
FIG. 3 is a relational database diagram for a DBMS catalog database showing the additions for the preferred embodiment.

Referring to FIG. 3, the modifications to the database management system catalog database for the preferred embodiment are shown in a relational database diagram format. The tables shown are conceptual in nature and are not based on a specific database management system. The tables and columns represented in FIG. 3 exist in various formats in different database management systems.

Table 200 shows the catalog table that contains information concerning database tables defined to the database management system. The "Table Name" column 201 represents the existing primary key of the table. A "Table Type" column 202 is used to indicate whether the table is a PHANTOM TABLE™. In the preferred embodiment, the "Table Type" column 202 contains a "P" if the database table is a PHANTOM TABLE™ and an "S" if it is not.

Table 220 shows the catalog table that contains information concerning stored procedures defined to the database management system. Although some database management systems make a distinction between stored procedures and user-defined functions, user-defined functions are treated as a type of stored procedure in the preferred embodiment. The "Stored Procedure Name" column 221 represents the existing primary key of the table. In the preferred embodiment, derivation formulas are defined as stored procedures or user-defined functions. Two columns are added to the stored procedure table 220 to accommodate derivation formulas. A "Stored Procedure Type" column 222 is added to enable the database management system to identify which stored procedures contain derivation formulas. In the preferred embodiment, an "F" would be entered in this column to identify a derivation formula and an "S" would be entered to identify a standard stored procedure. A "Multiple Value Indicator" column 223 is added to indicate whether a derivation formula will permit multiple results. In the preferred embodiment, a derivation formula may return a set of similar values as its result. The "Multiple Value Indicator" column 223 will be set to "Y" if multiple values are allowed for a derivation formula and "N" if they are not.

In the typical database management system, parameters may be defined to stored procedures for the purpose of passing information to them during their invocation. Table 250 shows the catalog that contains information concerning parameters defined to the various stored procedures maintained in the Stored Procedure table 220. In the preferred embodiment, no alterations are made to the Stored Procedure Parameter table 220. References are made to this table, however, to verify stored procedure parameter assignment values made when defining automatically derived columns.

Table 210 shows the catalog table which contains information concerning table columns defined to the database management system. The "Table Name" column 211 and the "Column Name" column 212 represent the existing primary key of the table. In the preferred embodiment, columns may be one of three derivation types. A "Derivation Type" column 213 is added to make this designation. The value assignment for the "Derivation Type" column 213 is "P" for a PHANTOM COLUMN™, "I" for an initially defaulted column, "C" for a CONTINUOUSLY DEFAULTED COLUMN™, and an "S" for standard columns, which are not derived. A derivation formula is assigned to each derived column. A "Derivation Formula" column 214 is added to the table to capture this assignment. The value of the "Derivation Formula" column 214 corresponds to the "Stored Procedure Name" column 221 of the Stored Procedure table 220. Columns which are not derived will contain a null entry in the "Derivation Formula" column 214. In the preferred embodiment, a PHANTOM COLUMN™ may represent a set of similar values as opposed to a single value. To accommodate this feature, the "Multiple Value Indicator" column 215 is added to the column table. A "Y" in this column indicates that a PHANTOM COLUMN™ may represent a set of similar values. The "Multiple Value Indicator" column 215 will be set to "N" in all other cases.

Table 240 is added to the catalog database and contains information concerning parameter assignment values for the derivation formula associated with a derived column. In order for the database management system to automatically invoke a derivation formula for a derived column, it may be necessary to provide values for derivation formula parameters. In the preferred embodiment, these assignment values are maintained in a Column Parameter Value table 240. Two of the columns defined for the table identify the column with which it is associated. A "Table Name" column 241 and a "Column Name" column 242 are defined to the Column Parameter Value table 240 and correspond to the "Table Name" column 211 and the "Column Name" column 212 of the Column table 210. A "Parameter Name" column 243 is defined to the table and identifies the derivation formula parameter for which a value is assigned. The "Parameter Name" column 243 corresponds to the "Parameter Name" column 251 of the Stored Procedure Parameter table 250 which is defined to the Stored Procedure table 220 with which the derived column is associated. The "Table Name" column 241, the "Column Name" column 242, and the "Parameter Name" column 243 comprise the primary key of the Column Parameter Value table 240. A "Parameter Value" column 244 is defined to the Column Parameter Value table 240 to hold the parameter assignment value for the derivation formula parameter. In the preferred embodiment, a derivation formula parameter assignment value may contain a constant, a system variable name, an expression or the name of a column belonging to the table to which the derived column belongs.

In the preferred embodiment, derived table columns may inherit the settings for characteristics related to the derivation process from similar characteristics associated with a user data type from which the column is created. Table 230 shows the catalog table which contains information concerning user data types defined to the database management system. The "User Data Type Name" column 231 represents the existing primary key of the table. A "Derivation Type" column 232 is added to the User Data Type table 230 the value of which may be inherited into the "Derivation Type" column 213 of the Column table 210. A "Derivation Formula" column 233 is added to the User Data Type table 230 the value of which may be inherited into the "Derivation Formula" column 214 of the Column table 210. A "Multiple Value Indicator" column 234 is added to the User Data Type table 230, the value of which may be inherited into the "Multiple Value Indicator" column 215 of the Column table 210.

In the preferred embodiment, derived table columns may also inherit derivation formula parameter assignment values from assignment values defined to a user data type from which the column is created. A User Data Type Parameter Value Table 260 is added which contains derivation formula parameter assignment values for a user data type. A "User Data Type Name" column 261 is added to identify the user data type for which the values are defined. A "Parameter Name" column 262 is added to the User Data Type Parameter Value table 260, the value of which may be inherited into the "Parameter Name" column 243 of the Column Parameter Value table 240. The "User Data Type Name" column 261 and the "Parameter Name" column 262 comprise the primary key of the User Data Type Parameter table 260. A "Parameter Value" column 263 is added to the User Data Type Parameter Value table 260, which may be inherited into the "Parameter Value" column 244 of the Column Parameter Value table 240. In the preferred embodiment, the "Parameter Value" column 263 of the User Data Type Parameter Value table 260 may contain a constant, a system variable name, an expression or an unqualified column name. The qualifier for an unqualified column name is defaulted during the inheritance process as the table to which the column will belong.

Table Definition Process

Figure 4:
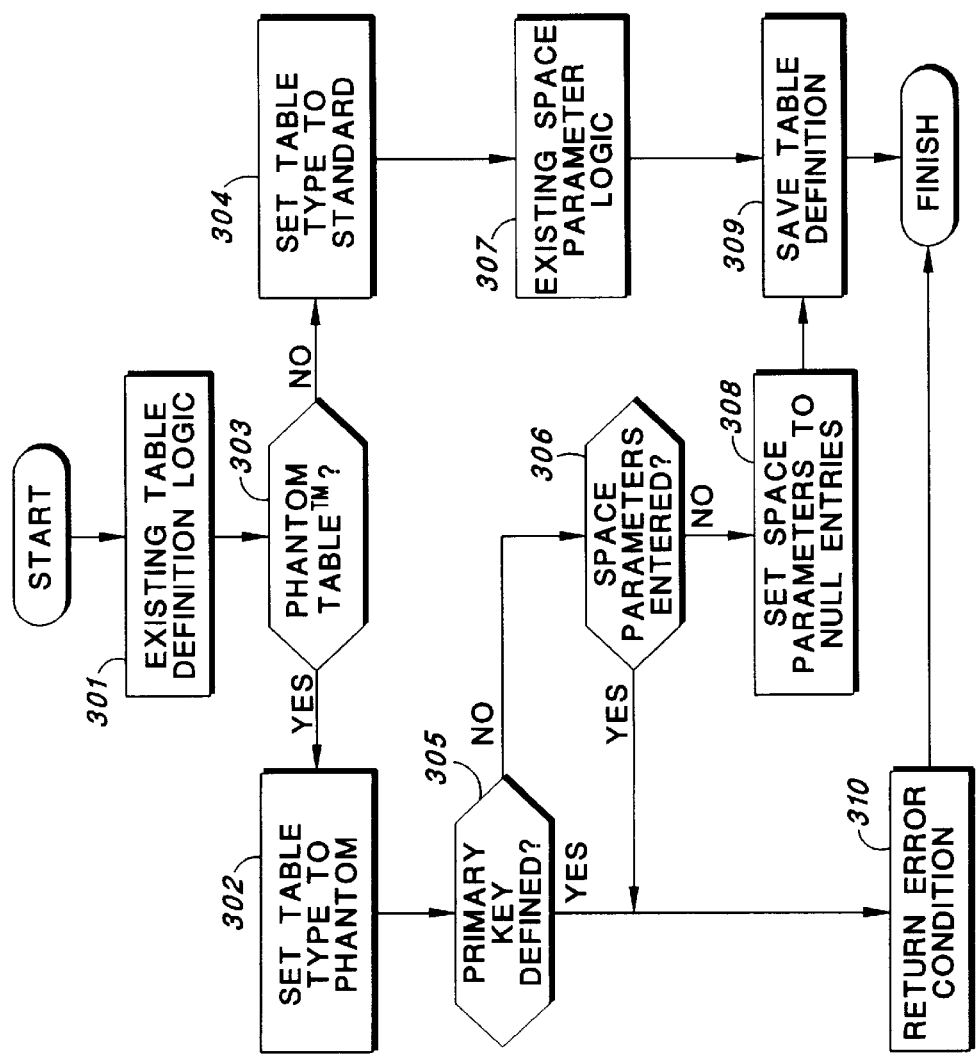
FIG. 4 is a flowchart showing the logic added to the table definition process in the preferred embodiment.

Referring to FIG. 4, the table definition process in the preferred embodiment is shown in flowchart form. The table definition process presented is intended to apply to both the creation of new table definitions and the modification of table definitions that are already in existence in a catalog database. The existing table definition process is modified to maintain a table type and to perform edits for PHANTOM TABLES™. A section of a generalized table definition statement which includes modifications proposed in the preferred embodiment follows.

| TABLE DEFINITION STATEMENT SYNTAX |
| --- |
| CREATE/ALTER TABLE table-name<br>(TYPE IS PHANTOM/<u>STANDARD</u>) |

In the preceding proposed table definition syntax, the variable "table-name" is a user-assigned name for the table. This variable must adhere to the table naming restrictions of the particular DBMS. In the preferred embodiment, a PHANTOM TABLE™ is identified by the inclusion of the phrase "TYPE IS PHANTOM" in the table definition text and a standard table is identified by the inclusion of the phrase "TYPE IS STANDARD". The phrase "TYPE IS PHANTOM/STANDARD" shown in the above syntax is optional and defines the table type selected. If this phrase is absent, the table is assumed to be of the standard type.

The Existing Table Definition Logic 301 executes and control is then passed to condition 303 which determines whether the table is defined as a PHANTOM TABLE™. This would be indicated by the inclusion of the phrase "TYPE IS PHANTOM" in the table definition text. If the phrase appears, control is passed to block 302 which registers the table as a PHANTOM TABLE™ by placing a "P" in the table type column of the temporary table buffer. Control is then passed to condition 305 which determines whether a primary key has been defined for the table. If so, an error is returned in block 310. In the preferred embodiment, a primary key may not be defined for a PHANTOM TABLE™ because the column values of a PHANTOM TABLE™ are not stored. Stored values are required for primary keys, as currently implemented in database management systems, to operate properly. If condition 305 determines that a primary key has not been defined, control is passed to condition 306 which determines whether space parameters have been defined for the table. If they have, an error is returned in block 310. In the preferred embodiment, the values of PHANTOM TABLE™ columns are not stored thereby eliminating the necessity for table space parameters. If condition 306 determines that spaces parameters have not been defined for the table, control is passed to block 308 which sets all space parameters to null entries in the temporary table buffer. The temporary table buffer is then saved into the catalog database in block 309. If condition 303 determines that the table is not defined as a PHANTOM TABLE™, control is passed to block 304 which registers the table as a standard table by placing an "S" in the table type column of the temporary table buffer. Control is then passed to block 307, which executes the existing space parameter logic. The temporary table buffer is then saved to the catalog database in block 309.

A psuedocode representation of the Table Definition Process flowchart shown in FIG. 4 follows:

| TABLE DEFINITION PROCESS |
|---|
| PERFORM EXISTING TABLE DEFINITION LOGIC.<br>IF THE TABLE DEFINITION CONTAINS 'TYPE IS PHANTOM'<br>    MOVE 'P' TO THE TABLE TYPE COLUMN<br>    IF A PRIMARY KEY IS DEFINED<br>        RETURN ERROR (PHANTOM TABLES ™ CANNOT HAVE PRIMARY KEYS)<br>    END-IF<br>    IF SPACE PARAMETERS ARE DEFINED<br>        RETURN ERROR (PHANTOM TABLES ™ CANNOT HAVE SPACE PARAMETERS)<br>    END-IF<br>    MOVE NULL ENTRIES TO ALL SPACES PARAMETERS<br>ELSE<br>    MOVE 'S' TO THE TABLE TYPE COLUMN<br>    PERFORM EXISTING SPACE PARAMETER LOGIC<br>END-IF.<br>SAVE TABLE DEFINITION.<br>RETURN. (TABLE DEFINITION COMPLETED SUCCESSFULLY) |

Index Definition Process

Figure 5:
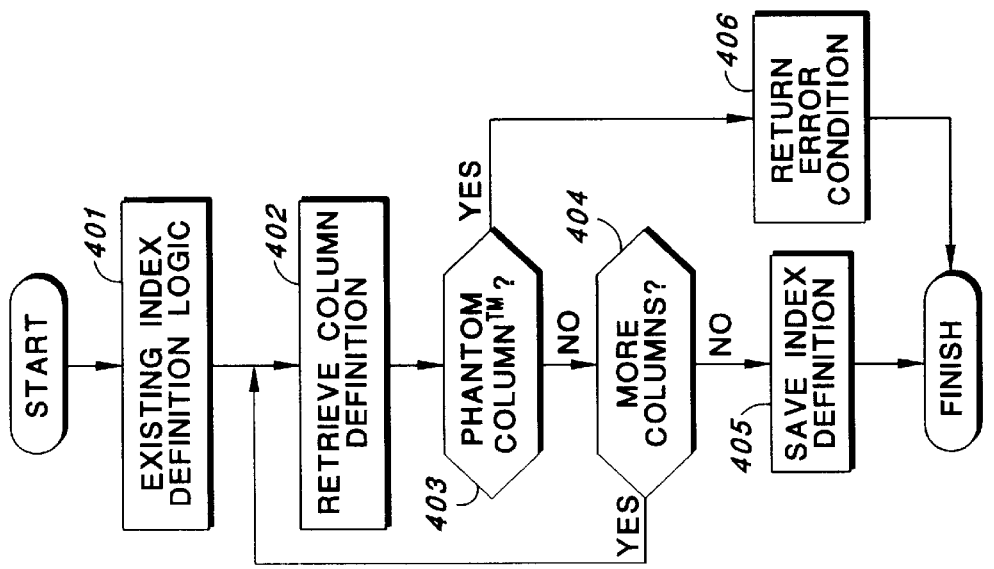
FIG. 5 is a flowchart showing the logic added to the index definition process in the preferred embodiment.

Referring to FIG. 5, the Index Definition process in the preferred embodiment is shown in flowchart form. The Index Definition Process presented is intended to apply to both the creation of new index definitions and the modifications of the index definitions that are already in existence in a catalog database. The existing Index Definition Process is modified to prevent indices from including PHANTOM COLUMNS™. PHANTOM COLUMNS™ are excluded from indices in the preferred embodiment because they have no values in database storage.

The Existing Index Definition Logic 401 executes and control is then passed to block 402 which retrieves the definition for a column included in the index. For indices to operate properly as currently implemented in database management systems, column values are required.

Control is then passed to condition 403 which determines whether the column is defined as a PHANTOM COLUMN™. If so, an error condition is indicated in block 406. If condition 403 determines that the column named in the index is not a PHANTOM COLUMN™, control is passed to condition 404. Condition 404 determines whether there are any additional columns included in the index which have not been processed. If so, control is passed back to block 402. Block 402, condition 403, and condition 404 are processed recursively until condition 404 determines that all columns included in the index have been processed or until an error is encountered. If condition 404 determines that all columns included in the index have been processed, control is passed to block 405 which saves the index definition in the catalog database.

A psuedocode representation of the Index Definition Process flowchart shown in FIG. 5 follows:

| INDEX DEFINITION PROCESS |
|---|
| PERFORM EXISTING INDEX DEFINITION LOGIC.<br>REPEAT UNTIL ALL COLUMNS IN THE INDEX HAVE BEEN PROCESSED<br>    RETRIEVE THE COLUMN DEFINITION FROM THE CATALOG DATABASE<br>    IF THE COLUMN IS A PHANTOM COLUMN ™ (COLUMN TYPE = "P")<br>        RETURN ERROR (AN INDEX CANNOT CONTAIN A PHANTOM COLUMN ™)<br>    END-IF<br>END-REPEAT.<br>SAVE INDEX DEFINITION.<br>RETURN. (INDEX DEFINITION COMPLETED SUCCESSFULLY) |

Stored Procedure Definition Process

In the preferred embodiment, derivation formulas are maintained as stored procedures. The format of derivation formulas is more restrictive than that of the stored procedures allowable in most database management systems. Therefore, additional edits must be added to the Stored Procedure Definition process. User-defined functions are considered a type of stored procedure in the preferred embodiment. However, user-defined functions, as implemented in several database management systems, already enforce the additional edits required of stored procedures to allow them to accommodate derivation formulas. Only the addition of multiple value functionality is required for user-defined functions to accommodate derivation formulas as described herein.

Figure 6:
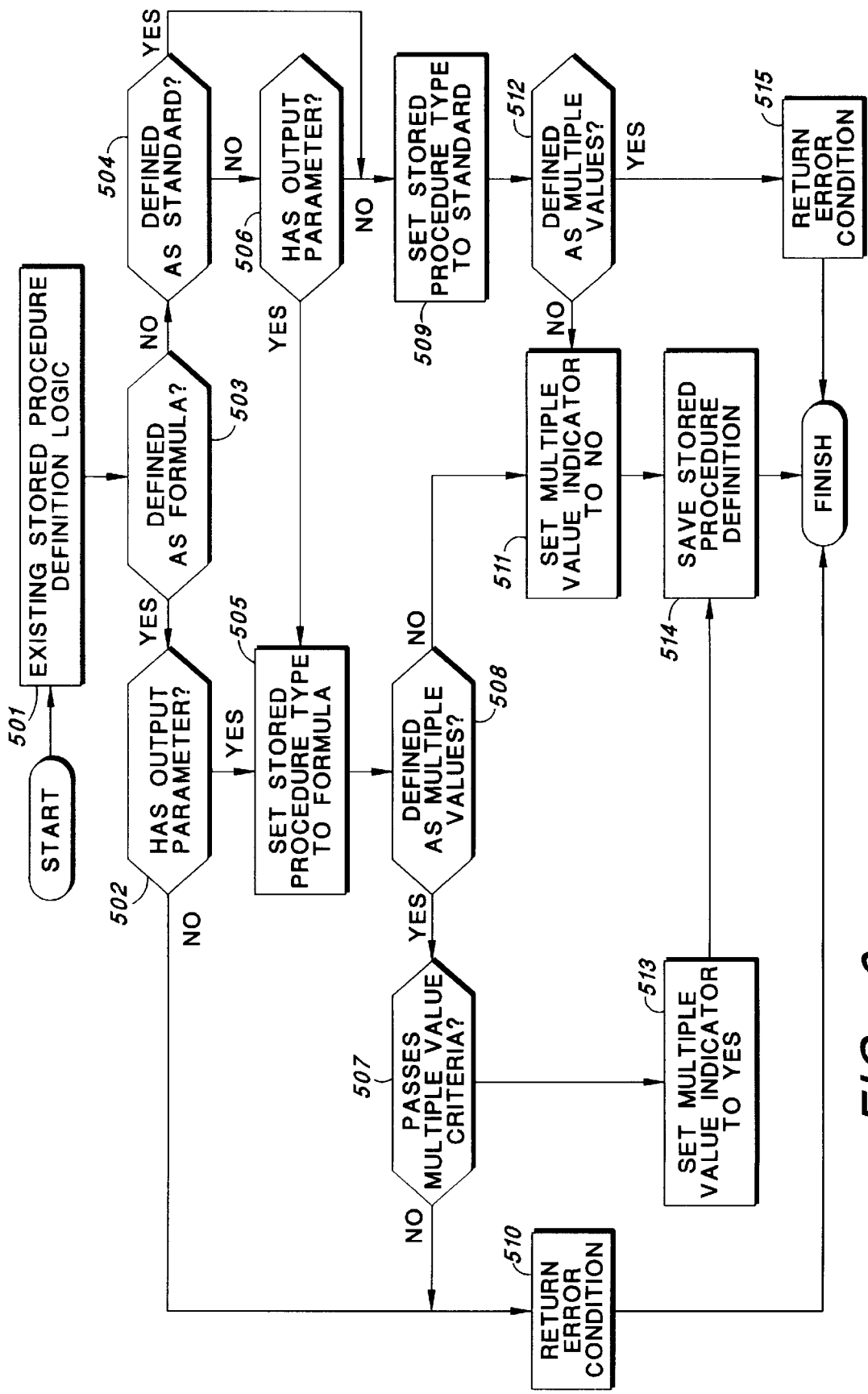
FIG. 6 is a flowchart showing the logic added to the stored procedure definition process in the preferred embodiment.

FIG. 6 shows the Stored Procedure Definition process in flowchart form. The stored procedure definition process presented is intended to apply to both the creation of new stored procedures and the modification of stored procedures that already exist in a catalog database. The existing Stored Procedure Definition Process is modified to include logic specific to derivation formulas. The maintenance of a Stored Procedure Type is also added in this process. A section of a typical stored procedure definition statement containing modifications proposed in the preferred environment follows.

| STORED PROCEDURE DEFINITION STATEMENT SYNTAX |
| --- |
| CREATE/ALTER STORED PROCEDURE/USER-DEFINED FUNCTION procedure-name<br>(TYPE IS FORMULA/<u>STANDARD</u>)<br>(MULTIPLE VALUES ARE/<u>ARENOT</u> ALLOWED)<br>(parameter-1 datatype, parameter-2 datatype . . . )<br>RETURN datatype |

In the preceding proposed stored procedure definition syntax, the variable "procedure-name" is a user-assigned name for the stored procedure or user-defined function. This variable must adhere to the naming restrictions of the particular DBMS. In the preferred embodiment, a derivation formula is identified by the inclusion of the phrase "TYPE IS FORMULA" in the stored procedure definition text and a standard stored procedure is identified by the inclusion of the phrase "TYPE IS STANDARD". If neither phrase is included in a stored procedure definition and it is defined with an output parameter, the phrase "TYPE IS FORMULA" is assumed. The type phrase is omitted in the definition of a user-defined function since all user-defined functions quality as derivation formulas. In the preferred embodiment, a derivation formula must be defined with a single output parameter which will be used to return the derived value. The data type of the return output parameter is assigned by the required phrase "RETURN datatype". Some derivation formulas may return multiple values as their result. An indication is made identifying those derivation formulas which allow multiple values. In the preferred embodiment, this is accomplished by inclusion of the phrase "MULTIPLE VALUES ARE ALLOWED" in the stored procedure definition text. Inclusion of the phrase "MULTIPLE VALUES ARE NOT ALLOWED" indicates that multiple values are not to be permitted for the derivation formula.

If the optional multiple value indication phrase is omitted, the phrase "MULTIPLE VALUES ARE NOT ALLOWED" is assumed for the derivation formula. The phrase "(parameter-1 datatype, parameter-2 datatype . . . ) is optional and is used to define input parameters to the derivation formula. This functionality already exists in most database management systems.

The Existing Stored Procedure Definition Logic 501 executes and control is then passed to condition 503 which determines whether the stored procedure has been defined as a derivation formula. If so, control is passed to condition 502 which verifies that the stored procedure has a single output parameter. If this is the case, control is passed to block 505 which registers the stored procedure as a derivation formula by placing an "F" in the Stored Procedure Type column of the temporary stored procedure buffer. Control is then passed to condition 508. Condition 508 determines whether the derivation formula has been defined as allowing multiple values. If this is the case, control is passed to condition 507 which determines whether the derivation formula, as written, is capable of returning multiple values. If control is passed to block 513 which registers the derivation formula as allowing multiple values by placing a "Y" in the Multiple Value Indicator column of the temporary stored procedure buffer. Control is then passed to block 514 which uses the temporary stored procedure buffer containing the stored procedure definition to update the catalog database. If condition 507 determines that the derivation formula is not capable of returning multiple values, an error is returned in block 510. If condition 508 determines that the derivation formula has not been defined as allowing multiple values, control is passed to block 511 which registers the derivation formula as not allowing multiple values by placing an "N" in the Multiple Value Indicator column of the temporary stored procedure buffer. Control is then passed to block 514 which uses the temporary stored procedure buffer containing the stored procedure definition to update the catalog database. If condition 502 determines that the stored procedure does not have an output parameter, an error is returned in block 510. If condition 503 determines that the stored procedure has not been defined as a derivation formula, control is passed to condition 504. Condition 504 determines whether the stored procedure has been specifically defined as a standard stored procedure. If so, control is passed directly to block 509 which registers the stored procedure as a standard stored procedure by placing an "S" in the Stored Procedure Type column of the temporary stored procedure buffer. Control is then passed to condition 512 which determines whether an attempt has been made to define the stored procedure as allowing multiple values. If so, an error is returned in block 515 because the multiple value indicator is not intended to be used with standard stored procedures. If not, control passes to block 511 which registers the fact that the stored procedure does not allow multiple values by placing an "N" in the Multiple Value Indicator column of the temporary stored procedure buffer. Control is then passed to block 514 which uses the temporary stored procedure buffer containing the stored procedure definition to update the catalog database. If condition 504 determines that the stored procedure has not been specifically defined as a derivation formula, control is passed to condition 506 which determines whether the stored procedure meets the criteria for a derivation formula by having been defined with a single output parameter. In the preferred embodiment, a stored procedure that qualifies as a derivation formula is assumed to be a derivation formula unless specifically defined as a standard stored procedure. If the stored procedure meets the criteria for a derivation formula in condition 506, control is passed to block 505 and the stored procedure definition process continues from that point as described earlier for derivation formulas. If condition 506 determines that the stored procedure does not meet the criteria for a derivation formula, control is passed to condition 511 and the stored procedure definition process continues from that point as described earlier for standard stored procedures.

A psuedocode representation of the Stored Procedure Definition Process flowchart shown in FIG. 6 follows:

| STORED PROCEDURE DEFINITION PROCESS |
|---|
| PERFORM EXISTING STORED PROCEDURE DEFINITION LOGIC.<br>IF 'TYPE IS FORMULA' APPEARS IN STORED PROCEDURE DEFINITION<br>    IF THE STORED PROCEDURE HAS A SINGLE OUTPUT PARAMETER<br>        PERFORM DERIVATION FORMULA PROCESS (DEFINED BELOW)<br>    ELSE<br>        RETURN ERROR (INCORRECT DERIVATION FORMULA FORMAT)<br>    END-IF<br>ELSE<br>    IF 'TYPE IS STANDARD' APPEARS IN THE DEFINITION<br>        PERFORM STANDARD STORED PROCEDURE PROCESS (DEFINED BELOW)<br>    ELSE<br>        IF THE STORED PROCEDURE HAS A SINGLE OUTPUT SINGLE OUTPUT PARAMETER<br>            PERFORM DERIVATION FORMULA PROCESS (DEFINED BELOW)<br>        ELSE<br>            PERFORM STANDARD STORED PROCEDURE PROCESS (DEFINED BELOW)<br>    END-IF<br>END-IF.<br>SAVE STORED PROCEDURE DEFINITION.<br>RETURN. (STORED PROCEDURE DEFINITION COMPLETED SUCCESSFULLY)<br>DERIVATION FORMULA PROCESS.<br>    MOVE 'F' TO THE STORED PROCEDURE TYPE COLUMN.<br>    IF 'MULTIPLE VALUES ARE ALLOWED' APPEARS IN DEFINITION<br>        IF THE STORED PROCEDURE IS CAPABLE OF RETURNING MULTIPLE VALUES<br>            MOVE 'Y' TO THE MULTIPLE VALUE INDICATOR<br>        ELSE<br>            RETURN ERROR (FORMULA IS AN INVALID MULTIPLE VALUE DERIVATION FORMULA)<br>        END-IF<br>    ELSE<br>    MOVE 'N' TO THE MULTIPLE VALUE INDICATOR<br>    END-IF.<br>    RETURN.<br>STANDARD STORED PROCEDURE PROCESS.<br>    MOVE 'S' TO THE STORED PROCEDURE TYPE COLUMN.<br>    IF 'MULTIPLE' VALUES ARE ALLOWED APPEARS IN DEFINITION<br>        RETURN ERROR (ONLY FORMULAS CAN USE THE MULTIPLE VALUE INDICATOR)<br>    ELSE<br>        MOVE 'N' TO THE MULTIPLE VALUE INDICATOR |

User Data Type Definition Process

In the preferred embodiment, table columns may inherit characteristics pertaining to the derivation process from the user data types from which they are created. This feature is intended to facilitate the definition of derived columns to the database. It is possible, using this feature, to create a user data type that contains the derivation process characteristics for a type of column that will appear multiple times in various database tables. If such a user data type is created, the derived columns may be created during the column definition process by including a reference to the user data type. All derivation process characteristics defined for the user data type may be inherited by the column and need not be specified. During user data type definition, a derivation type, a derivation formula, a multiple value indicator, and derivation formula parameter assignment values are maintained. In the preferred embodiment, derivation process characteristics defined to a user data type may be overridden during the column definition process Referring to FIG. 7A and FIG. 7B, which show a flow-chart representation of the use data type definition process in the preferred embodiment. The user data type definition process presented is intended to apply to both the creation of new user data type definitions and the modification of user data type definitions which are already in existence in the catalog database. A section of typical user data type definition statement containing modifications proposed in the preferred embodiment follows.

| USER DATA TYPE DEFINITION STATEMENT SYNTAX |
|---|
| CREATE/ALTER USER DATA TYPE user-datatype-name<br>(TYPE IS PHANTOM/INITIALLY DEFAULTED/CONTINUOUSLY DEFAULTED/STANDARD)<br>(MULTIPLE VALUES ARE/ARENOT ALLOWED)<br>(FORMULA IS formula-name<br>    (parameter-name-1 = assignment-1,<br>    parameter-name-2 = assignment-2, . . . )) |

In the preceding proposed user data type definition syntax, the variable "user-datatype-name" is a user-assigned name for the user data type. This variable must adhere to the use data type naming restrictions of the particular DBMS. The derivation type is specified in the user data type definition text by the inclusion of a derivation type phrase. The phrase "TYPE IS PHANTOM" identifies the user data type as a PHANTOM COLUMN™ user data type. The phrase "TYPE IS INITIALLY DEFAULTED" identifies the user data type as an initially defaulted column user data type. The phrase "TYPE IS CONTINUOUSLY DEFAULTED" identifies the user data type as a CONTINUOUSLY DEFAULTED COLUMN™ user data type. The phrase "TYPE IS STANDARD" identifies the user data type as a non-derived column user data type. The inclusion of the derivation type phrase is optional. If omitted, the phrase "TYPE IS STANDARD" is assumed. The phrase "MULTIPLE VALUES ARE ALLOWED" is included to specify a user data type which may be used to create PHANTOM COLUMNS™ that may represent a set of similar values. The phrase "MULTIPLE VALUES ARE NOT ALLOWED" is included to specify that the columns created from a user data type will not inherit the ability to represent a set of similar values. The multiple values phrase in the user data type definition text is optional and is defaulted to "MULTIPLE VALUES ARE NOT ALLOWED", if it is omitted. The "FORMULA IS formula-name" phrase is required if the derivation type is other than standard. The "formula-name" variable must be the name of a user-defined function or a stored procedure which has been defined to the database management system as a derivation formula. Any input parameters required by the derivation formula are identified and given assignment values in the "parameter-name= assignment" phrases. Each parameter name in the parameter assignment phrase must correspond to an input parameter defined to the named stored procedure or user-defined function. Each assignment value may be a constant, a system variable, an expression, or an unqualified column name. Unqualified column names will be fully qualified when a column is created using the user data type.

Figure 7A:
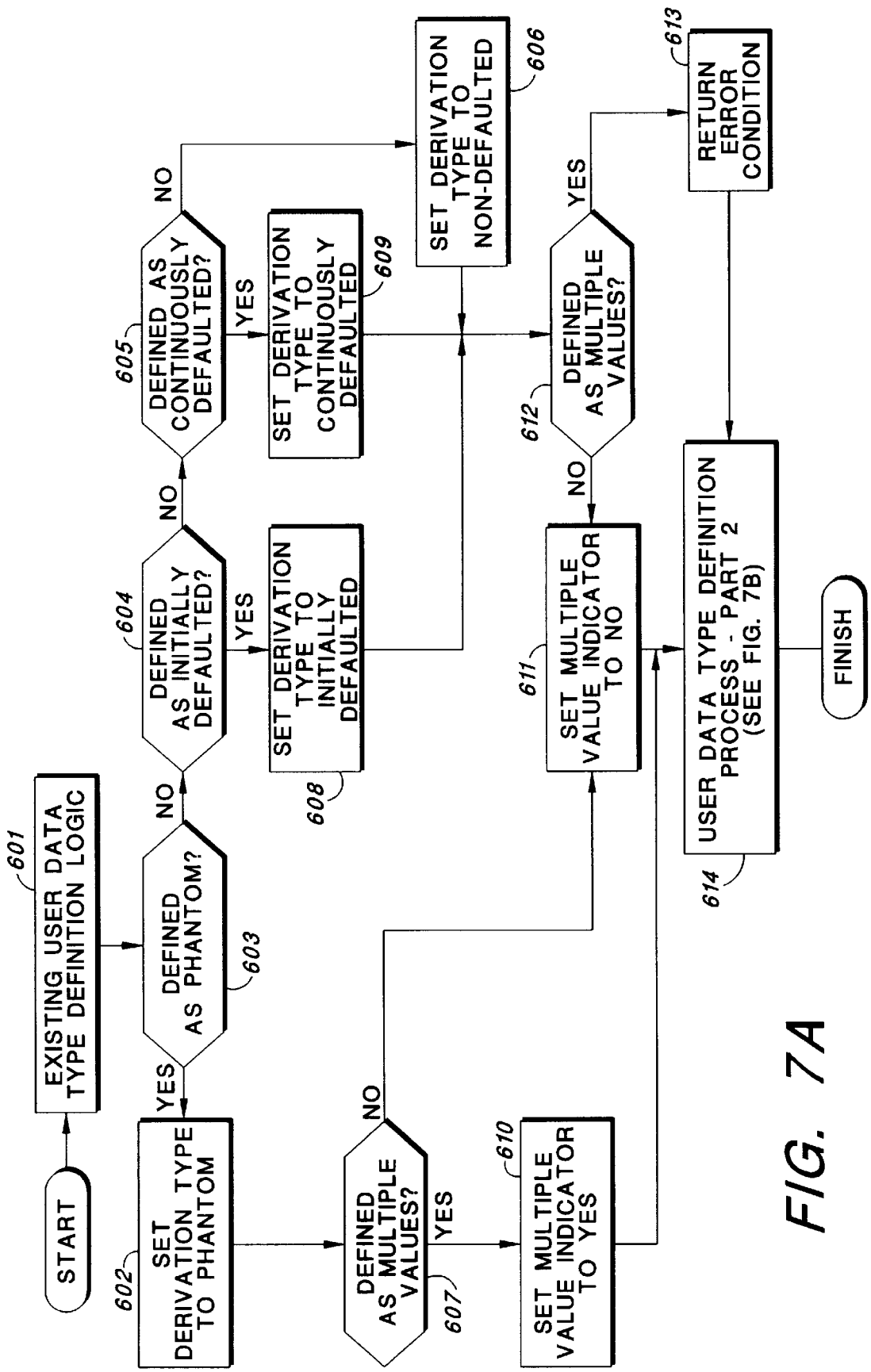
FIGS. 7A and 7B are flowcharts showing the logic added to the user data type definition process in the preferred embodiment.
Figure 7B:
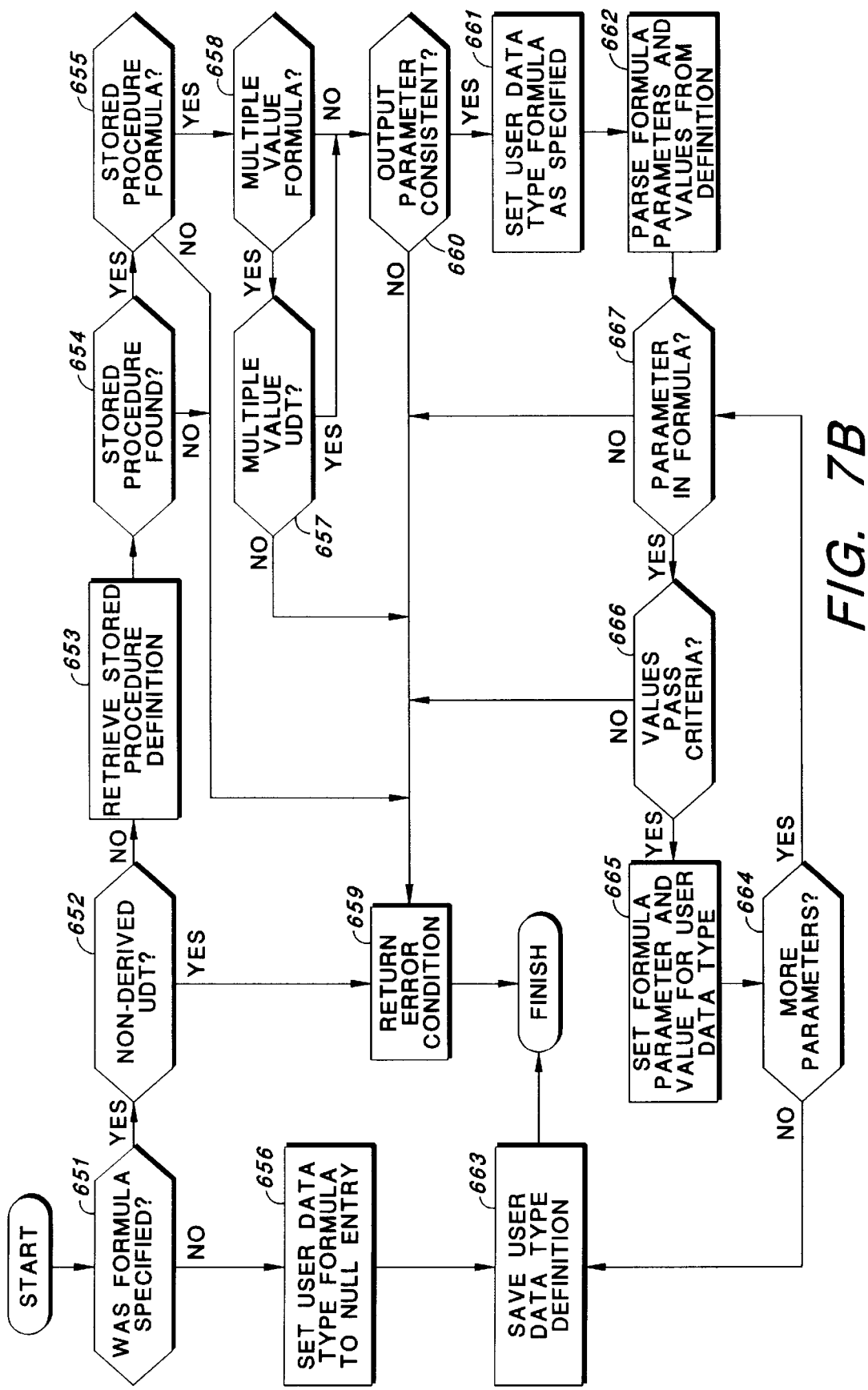

In FIG. 7A, the Existing User Data Type Definition logic 601 executes and control is then passed to condition 603, which determines whether the user data type has been defined as a "PHANTOM COLUMN™" user data type by the inclusion of the "TYPE IS PHANTOM". If so, control is passed to block 602, which registers the user data type as a PHANTOM COLUMN™ user data type by placing a "P" in the Derivation Type column of the temporary user data type buffer. Control is then passed to condition 607 which determines whether the user data type has been defined as allowing multiple values by the inclusion of the "MULTIPLE VALUES ARE ALLOWED" phrase in the definition text. If so, control is passed to block 610, which registers the user data type as allowing multiple values by placing a "Y" in the Multiple Value Indicator column of the temporary user data type buffer. Control is then passed to the portion of the user data type definition, which is shown in FIG. 7B and represented in this flowchart as block 614. If condition 607 determines that the user data type is not defined as allowing multiple values, control is passed to block 611 which registers it as such by placing an "N" in the Multiple Value Indicator of the temporary user data type buffer. Control is then passed to the portion of the user data type definition process that is shown in FIG. 7B and represented in this flowchart as block 614. If condition 603 determines that the user data type is not defined as a PHANTOM COLUMN™ user data type, control is passed to condition 604. Condition 604 and condition 605 then determine the Derivation Type of the user data type. If condition 604 determines that the user data type is defined as an initially defaulted column user data type by the inclusion of the "TYPE IS INITIALLY DEFAULTED" phrase in the definition text, control is passed to block 608 which registers the user data type as an initially defaulted column user data type by placing an "I" in the Derivation Type column of the temporary user data type buffer. If condition 605 determines that the user data type is defined as a CONTINUOUSLY DEFAULTED COLUMN™ user data type by the inclusion of the "TYPE IS CONTINUOUSLY DEFAULTED" phrase in the definition text, control is passed to block 609 which registers the user data type as a CONTINUOUSLY DEFAULTED COLUMN™ user data type by placing a "C" in the Derivation Type column of the temporary user data type buffer. If Condition 604, and condition 605 determine that the user data type is not defined as an initially defaulted column user data type or a CONTINUOUSLY DEFAULTED COLUMN™ user data type, the user data type is assumed to be a standard column user data type. In this case, control is passed to block 606, which registers the user data type as a non-derived column user data type by placing an "N" in the Derivation Type column of the temporary user data type buffer. After the derivation type is registered by block 608, block 609 or block 606, control is passed to condition 612. Condition 612 determines whether the user data type has been defined as allowing multiple values by the inclusion of the "MULTIPLE VALUES ARE ALLOWED" phrase in the definition text. If so, an error condition is indicated in block 613 because only PHANTOM COLUMN™ user data types may be defined as allowing multiple values. If condition 612 determines that the user data type is not defined as allowing multiple values, control is passed to block 611 which registers it as such by placing an "N" in the Multiple Value Indicator of the temporary user data type buffer. Control is then passed to the portion of the user data type definition process that is shown in FIG. 7B and represented in this flowchart as block 614.

FIG. 7B shows the portion of the user data type definition process which validates the derivation formula and derivation formula parameter value assignments entered in the user data type definition and saves the user data type definition. The portion of the User Data Type Definition process shown in FIG. 7B is shown in flowchart form and is also represented as block 614 in FIG. 7A. In FIG. 7B, Condition 651 determines whether a derivation formula was specified in the user data type definition by the inclusion of the "FORMULA IS formula-name" phrase. If not, control is passed to block 656 which places a null entry in the Derivation Formula column of the temporary user data type buffer. The user data type definition is then saved in the catalog database from the temporary user data type buffer in block 663. If condition 651 determines that a derivation formula has been entered in the definition, control is passed to condition 652. Condition 652 determines whether the user data type is a non-derived column user data type. If it is, an error is returned in block 659 because standard user data types may not have derivation formulas assigned to them. If condition 652 determines that the user data type is a derived column user data type, control is passed to block 653 which retrieves the stored procedure or user-defined function from the catalog database. Control is then passed to condition 654 which determines whether an error was encountered while retrieving the stored procedure in block 653. If so, an error is returned in block 659. If the stored procedure was successfully retrieved, control is passed to condition 655, which determines whether the stored procedure retrieved is a derivation formula. If it is not, an error is returned. If the stored procedure is a derivation formula, control is passed to condition 658. Condition 658 determines whether the derivation formula allows multiple values. If it does, control is passed to condition 657, which determines whether the Multiple Value Indicator column in the temporary user data type buffer indicates that the user data type allows multiple values. If it does not, the multiple value indicators of the derivation formula and the user data type are inconsistent and an error is returned. If condition 658 determines that the derivation formula does not allow multiple values or condition 657 determines that the user data type does allow multiple values, control is passed to condition (block 660).

Condition 660 compares the system data type of the output parameter of the derivation formula with the system data type of the user data type. If condition 660 determines that the two are incompatible, an error condition is indicated (Block 659). If they are compatible, control is passed to block 661 which places the name of the derivation formula specified into the Derivation Formula column of the temporary user data type buffer. Control is then passed to block 662, which parses the derivation parameters and assignment values included in the user data type definition text. Control is then passed to condition 667. Condition 667 determines whether a parameter included in the definition text is named as a parameter in the derivation formula. If it is not, an error is returned. If the parameter is included in the derivation formula, control is passed to condition 666, which determines whether the value associated with the parameter is valid. If the value is a constant, it must be compatible with the data type of the parameter in the derivation formula. If the value is a system variable name, the system variable data type must be compatible with the parameter in the formula. If the value is an expression, the result of that expression must be compatible with the data type of the derivation formula parameter. If the value is not one of those previously mentioned, it must be a valid unqualified column name. If condition 666 determines that the assignment value specified is invalid, an error condition is indicated (block 659). If the assignment value is valid, control is passed to block 665 which registers the parameter name and the assignment value in the temporary user data type buffer. Control is then passed to condition 664, which determines whether more parameters were defined which have not been processed. If so, control is passed back to condition 667. Condition 667, condition 666, block 665 and condition 664 are processed recursively until condition 664 determines that all parameters included in the definition text have been processed or until an error is encountered. If condition 664 determines that all parameters specified in the definition have been processed, control is passed to block 663, which saves the user data type definition into the catalog database from the temporary user data type buffer.

A psuedocode representation of the User Data Type Definition Process flowchart shown in FIG. 7A and FIG. 7B follows:

```
USER DATA TYPE DEFINITION PROCESS

PERFORM EXISTING USER DATA TYPE DEFINITION LOGIC.
IF 'TYPE IS PHANTOM' APPEARS IN USER DATA TYPE DEFINITION
    MOVE 'P' TO THE DERIVATION TYPE COLUMN
    IF 'MULTIPLE VALUES ARE ALLOWED' APPEARS IN THE DEFINITION
        MOVE 'Y' TO THE MULTIPLE VALUE INDICATOR COLUMN
    ELSE
        MOVE 'N' TO THE MULTIPLE VALUE INDICATOR COLUMN
    END-IF
ELSE
    IF 'TYPE IS INITIALLY DEFAULTED' APPEARS IN THE DEFINITION
        MOVE 'I' TO THE DERIVATION TYPE COLUMN
    ELSE
        IF 'TYPE IS CONTINUOUSLY DEFAULTED' APPEARS IN THE
DEFINITION
            MOVE 'C' TO THE DERIVATION TYPE COLUMN
        ELSE
            MOVE 'N' TO THE DERIVATION TYPE COLUMN
        END-IF
    END-IF
    IF 'MULTIPLE VALUES ARE ALLOWED' APPEARS IN THE DEFINITION
        RETURN ERROR (ONLY PHANTOM USER DATA TYPES MAY HAVE
MULTIPLE VALUES)
    ELSE
        MOVE 'N' TO THE MULTIPLE VALUE INDICATOR COLUMN
    END-IF
END-IF.
IF 'FORMULA IS . . . ' PHRASE APPEARS IN THE DEFINITION
    IF NON-DERIVED COLUMN USER DATA TYPE
        RETURN ERROR (ONLY DERIVED USER DATA TYPES MAY HAVE
FORMULAS)
    END-IF
    RETRIEVE THE STORED PROCEDURE FROM CATALOG
    IF AN ERROR WAS ENCOUNTERED
        RETURN ERROR (STORED PROCEDURE NOT FOUND)
    END-IF
IF STORED PROCEDURE IS NOT A FORMULA
    RETURN ERROR (STORED PROCEDURE IS NOT A FORMULA)
END-IF
IF IT IS A MULTIPLE VALUE FORMULA
    IF THE USER DATA TYPE DOES NOT ALLOW MULTIPLE VALUES
        RETURN ERROR (MULTIPLE VALUES INDICATORS ARE INCONSISTENT)
    END-IF
END-IF
    IF THE FORMULA OUTPUT PARAMETER IS INCOMPATIBLE WITH THE
USER DATA TYPE
        RETURN ERROR (OUTPUT PARAMETER IS INCONSISTENT WITH USER
DATA TYPE)
    END-IF
```

-continued

USER DATA TYPE DEFINITION PROCESS

MOVE THE DERIVATION FORMULA NAME TO THE DERIVATION FORMULA COLUMN
  PARSE THE PARAMETERS AND VALUE ASSIGNMENTS IN THE DEFINITION
  REPEAT UNTIL ALL PARAMETERS IN THE DEFINITION HAVE BEEN PROCESSED
    IF THE PARAMETER DOES NOT APPEAR IN THE FORMULA
      RETURN ERROR (PARAMETER DOES NOT APPEAR IN FORMULA)
    END-IF
    IF THE PARAMETER VALUE IS A CONSTANT
    AND IT IS INCONSISTENT WITH THE FORMULA PARAMETER DATA TYPE
      RETURN ERROR (VALUE IS INCONSISTENT WITH FORMULA PARAMETER)
    END-IF
    IF THE PARAMETER VALUE IS A SYSTEM VARIABLE NAME
    AND ITS DATA TYPE IS INCONSISTENT WITH THE FORMULA PARAMETER
      RETURN ERROR (VALUE IS INCONSISTENT WITH FORMULA PARAMETER)
    END-IF
    IF THE PARAMETER VALUE IS A FULLY QUALIFIED COLUMN NAME
    AND THE COLUMN DATA TYPE IS INCONSISTENT WITH THE PARAMETER
      RETURN ERROR (VALUE IS INCONSISTENT WITH FORMULA PARAMETER)
    END-IF
    IF THE PARAMETER VALUE IS NOT ONE OF THE ABOVE TYPES
    AND THE VALUE IS NOT AN UNQUALIFIED COLUMN NAME
      RETURN ERROR (PARAMETER VALUE IS INVALID)
    END IF
    MOVE THE PARAMETER NAME AND THE VALUE TO THE USER DATA TYPE BUFFER
  END-REPEAT.
ELSE
  MOVE NULLS TO THE DERIVATION FORMULA COLUMN
END-IF.
SAVE THE USER DATA TYPE DEFINITION AND ANY PARAMETER VALUES
RETURN. (USER DATA TYPE DEFINITION COMPLETED SUCCESSFULLY)

Column Definition Process

In the preferred embodiment, the values of table columns may be automatically derived by the database management system. In order for the database management system to perform this function, information pertaining to the derivation process must be retained for each derived table column defined. A derivation type is maintained for each derived column identifying the conditions under which the column is to be derived. In the preferred embodiment, there are three types of derived columns, PHANTOM COLUMNS™, initially defaulted columns and CONTINUOUSLY DEFAULTED COLUMNS™. PHANTOM COLUMNS™ require no database storage space and are derived at the time that the value of the column is requested. Initially defaulted columns are derived when a row containing this type of column is inserted into the database and no value has been provided for the column. CONTINUOUSLY DEFAULTED COLUMNS™ are derived when the value of the column is requested and a null entry is contained in database storage for the column.

A derivation formula name is maintained for each derived column. In the preferred embodiment, derivation formulas are maintained as stored procedures or user-defined functions. The derivation formula name maintained for the column is the name of the stored procedure which, when invoked by the database management system, will result in the value of the derived column. In the preferred embodiment, PHANTOM COLUMNS™ may represent a set of similar values as opposed to a single value. A multiple value indicator is maintained for each column identifying PHANTOM COLUMNS™ which may represent a set of similar values. A derivation formula may require that information be supplied for it to function properly. Information is communicated to derivation formulas through the use of input parameters. In order for the database management system to automatically invoke a derivation formula on behalf of a column, it may be required to provide assignment values for required derivation formula parameters. A set of derivation formula parameters and associated assignment values may be specified for each derived column to satisfy this requirement. In the preferred embodiment, all of the derivation process information described may be inherited from a user data type. If a user data type is specified during the definition of a column, all derivation process information will be copied from the user data type into the column definition unless it is specifically overridden.

Figure 8A:
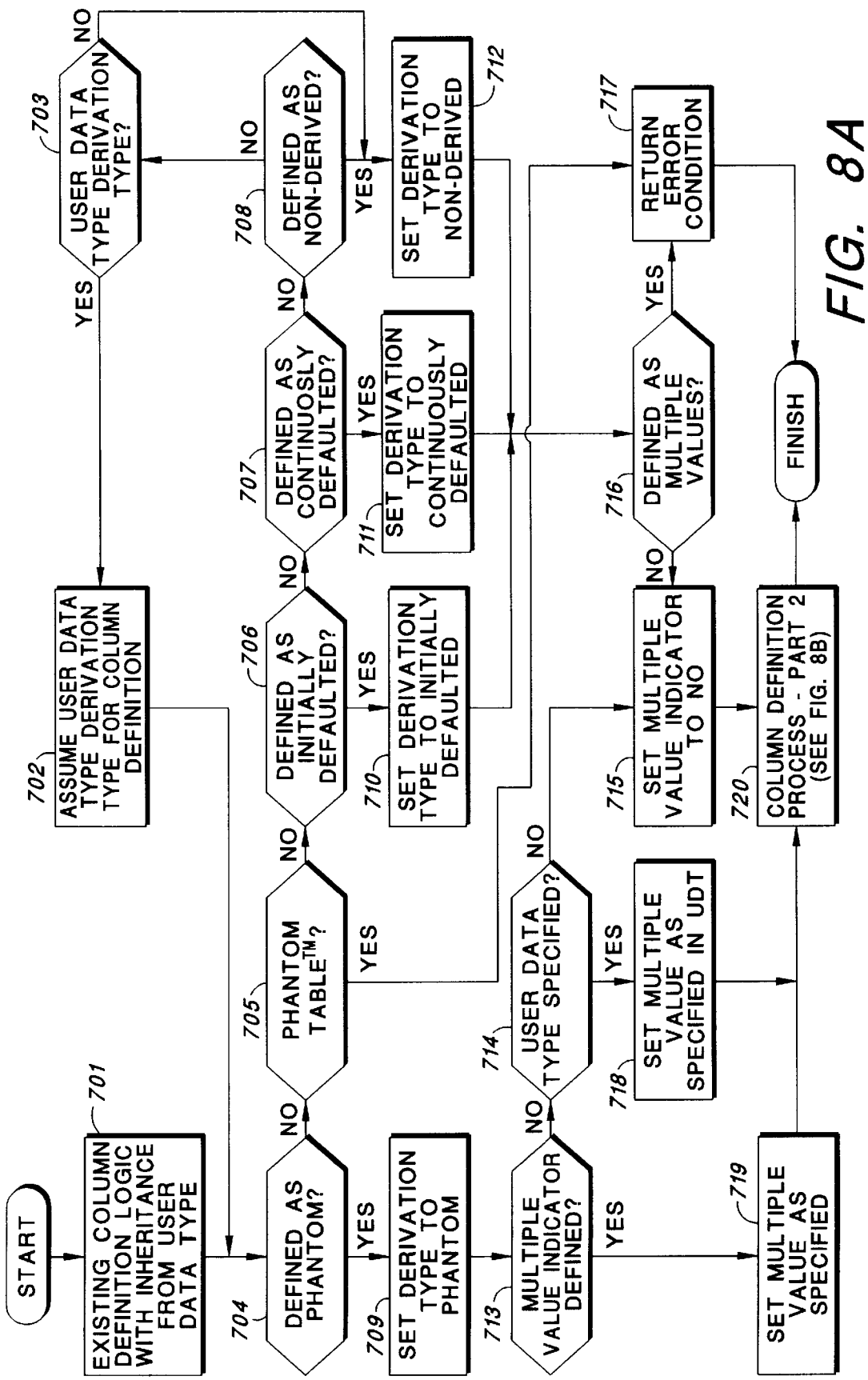
FIGS. 8A, 8B and 8C are flowcharts showing the logic added to the column definition process in the preferred embodiment.
Figure 8B:
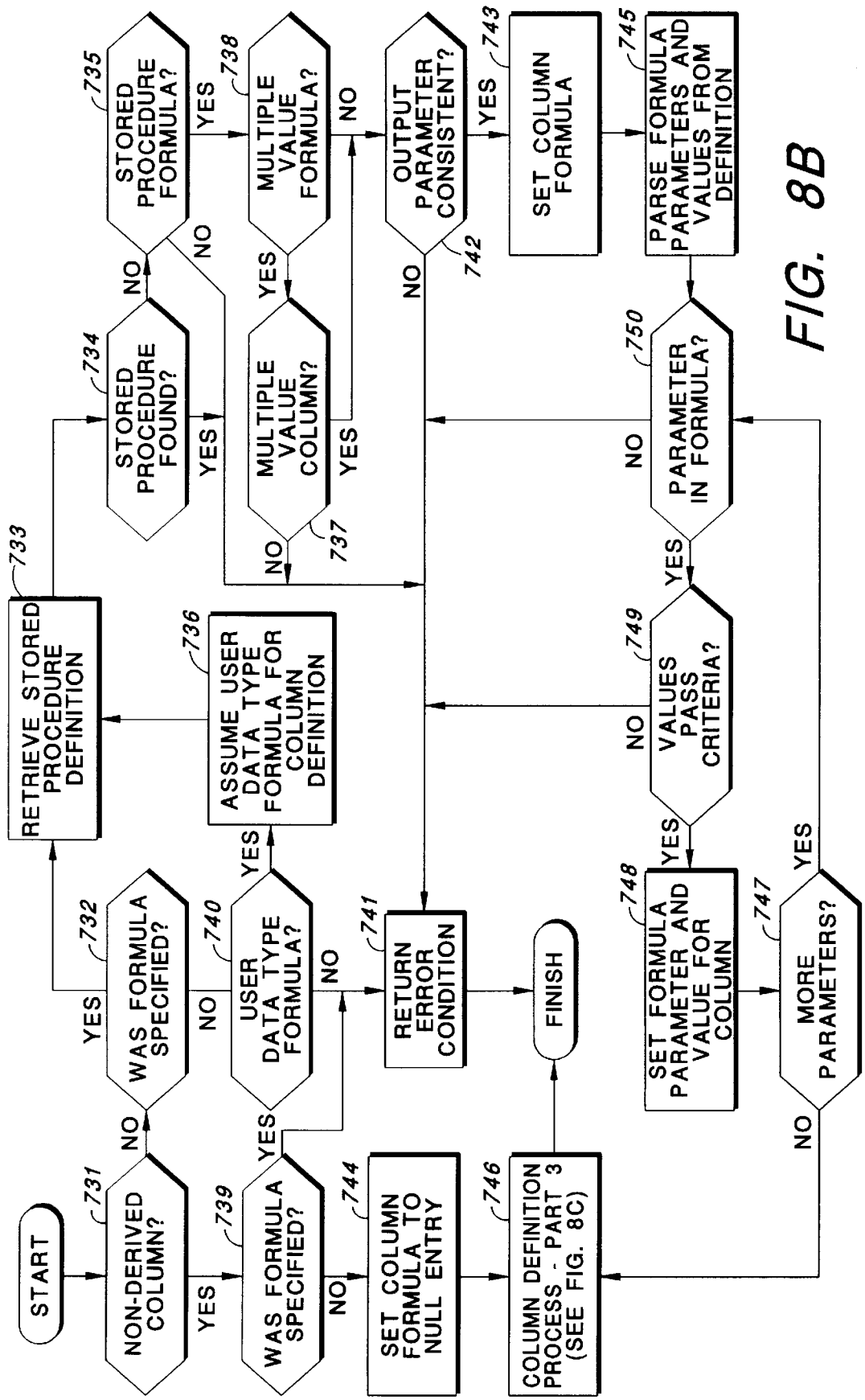
Figure 8C:
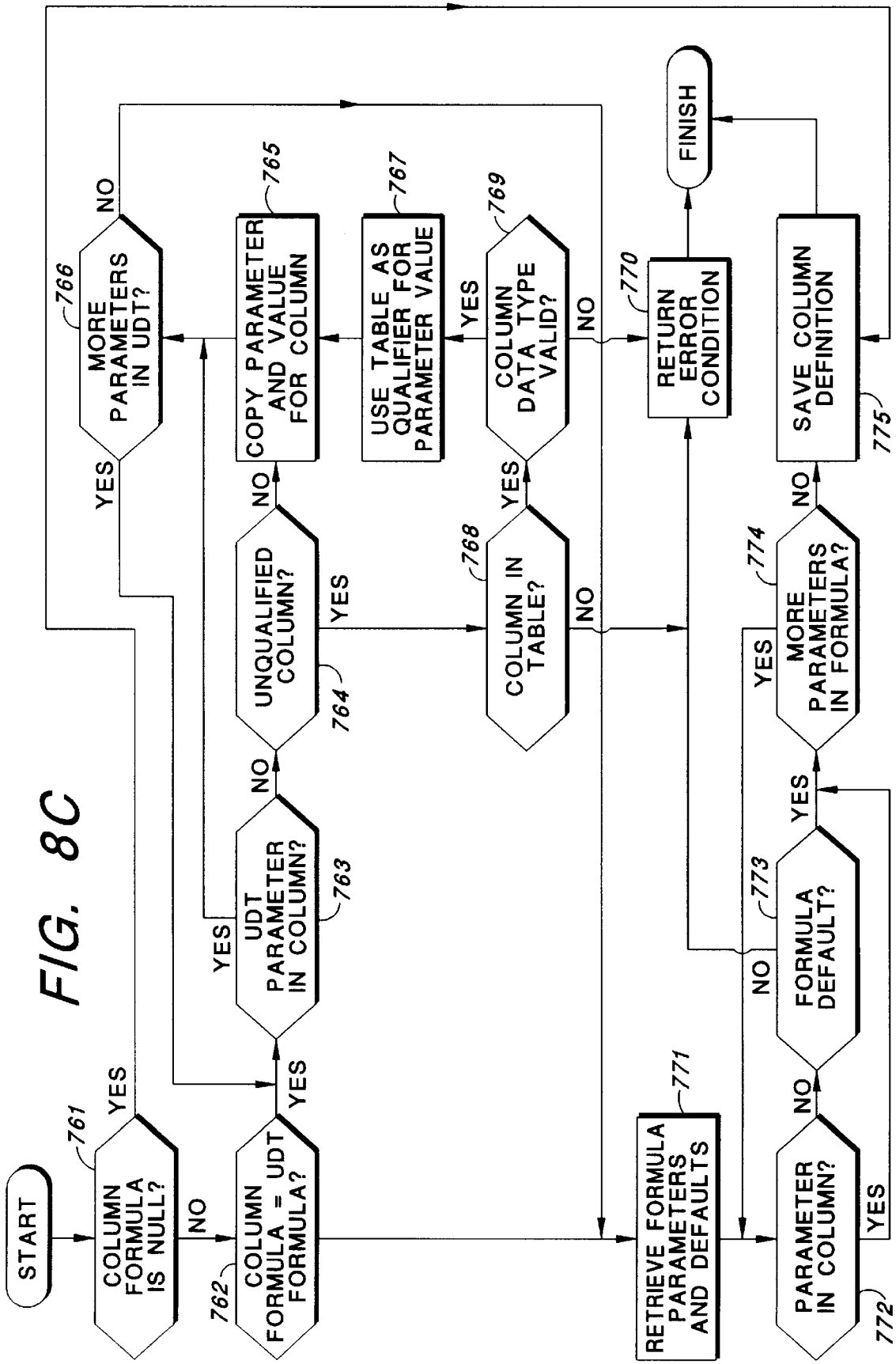

Referring to FIG. 8A, FIG. 8B, and FIG. 8C, a flowchart representation is shown of the column definition process in the preferred embodiment. The column definition process presented is intended to apply to both the creation of column definitions and the modification of column definitions which are already in existence in the catalog database. A section of a typical column definition statement containing modifications proposed in the preferred embodiment follows.

| COLUMN DEFINITION STATEMENT SYNTAX |
| --- |
| ADD/MODIFY column-name datatype-name<br>(TYPE IS PHANTOM/INITIALLY DEFAULTED/CONTINUOUSLY DEFAULTED/STANDARD)<br>(MULTIPLE VALUES ARE/ARENOT ALLOWED)<br>(FORMULA IS formula-name<br>    (parameter-name-1 = assignment-1,<br>        parameter-name-2 = assignment-2, . . . )) |

In the preceding proposed column definition syntax, the variable "column-name" is a user-assigned name for the column. This variable must adhere to the column naming restrictions of the particular DBMS. The data type from which the column will be created is identified by the "datatype-name" variable. The data type specified may be either a system data type or user data type. This capability already exists in many database managements systems. The derivation type is specified in the column definition text by the inclusion of a derivation type phrase. The phrase "TYPE IS PHANTOM" identifies a column as a PHANTOM COLUMN™. The phrase "TYPE IS INITIALLY DEFAULTED" identifies a column as an initially defaulted column. The phrase "TYPE IS CONTINUOUSLY DEFAULTED" identifies a column as a CONTINUOUSLY DEFAULTED COLUMN™. The phrase "TYPE IS STANDARD" identifies a column as a non-derived column. The inclusion of the derivation type phrase is optional. If omitted, the phrase "TYPE IS STANDARD" is assumed. The phrase "MULTIPLE VALUES ARE ALLOWED" is included to indicate that a PHANTOM COLUMN™ may represent a set of similar values as opposed to a single value.

The phrase "MULTIPLE VALUES ARE NOT ALLOWED" is included to specify that a column will not have the ability to represent a set of similar values. The multiple values phrase is also optional and is defaulted to "MULTIPLE VALUES ARE NOT ALLOWED" if it is omitted. The "FORMULA IS formula-name" phrase is required if the derivation type is other than standard. The "formula-name" variable must be the name of a stored procedure or user-defined function which has been defined to the database management system as a derivation formula. Any input parameters required by the derivation formula are identified and given assignment values in the "parameter-name=assignment" phrases. Each parameter name in the parameter assignment phrase must correspond to an input parameter defined to the named stored procedure or user-defined function. Each assignment value may be a constant, a system variable, an expression, or the name of a column from the table to which the derived column will belong. The derivation type, the multiple value indicator, the derivation formula, and derivation formula parameter assignment values may all be inherited from a user data type identified in "datatype-name".

FIG. 8A shows the portion of the column definition process which maintains the derivation type and the multiple value indicator. The Existing Column Definition logic 701 executes. Included in the execution of the existing column definition logic is the retrieval of any user data type definition specified for the purpose of inheriting column characteristics. After completion, block 701 passes control to condition 704 which determines whether the column has been defined as a PHANTOM COLUMN™ by the inclusion of the "TYPE IS PHANTOM" phrase in the column definition text. If so, control is passed to block 709 which registers the column as a PHANTOM COLUMN™ by placing a "P" in the Derivation Type column of the temporary column buffer. Control is then passed to condition 713, which determines whether the column definition includes the phrase "MULTIPLE VALUES ARE ALLOWED" or the phrase "MULTIPLE VALUES ARE NOT ALLOWED". If so, control is passed to block 719 which registers the PHANTOM COLUMN™ as either allowing or disallowing multiple values as specified in the definition by placing either a "Y" or an "N" respectively in the Multiple Value Indicator column of the temporary column buffer. Control is then passed to the portion of the column definition which is shown in FIG. 8B and represented in this flowchart as block 720. If condition 713 determines that a multiple value option has not been specified, control is passed to condition 714 which determines whether a user data type has been specified in the definition. If control is passed to block 718, which copies the multiple value indicator from the user data type to the Multiple Value Indicator column in the temporary column buffer. If condition 714 determines that a user data type was not specified, control is passed to block 715, which registers the column as not allowing multiple values by placing an "N" in the Multiple Value Indicator of the temporary column buffer. Control is then passed to the portion of the user data type definition process which is shown in FIG. 8B and represented in this flowchart as block 720.

If condition 704 determines that the column is not defined as a PHANTOM COLUMN™, control is passed to condition 705. Condition 705 then determines whether the table to which the column will belong is a PHANTOM TABLE™. If it is, an error is returned in block 717 because PHANTOM TABLES™ may only contain PHANTOM COLUMNS™. If condition 705 determines that the table is not a PHANTOM TABLE™, control is passed to condition 706. Condition 706, condition 707, and condition 708 then determine whether a derivation type has been specified in the column definition text. Condition 706 determines whether the column is defined as an initially defaulted column by the inclusion of the "TYPE IS INITIALLY DEFAULTED" phrase in the definition text. If so, control is passed to block 710, which registers the column as an initially defaulted column by placing an "I" in the Derivation Type column of the temporary column buffer. If condition 707 determines that the column is defined as a CONTINUOUSLY DEFAULTED COLUMN™ by the inclusion of the "TYPE IS CONTINUOUSLY DEFAULTED" phrase in the definition text, control is passed to block 711 which registers the column as a CONTINUOUSLY DEFAULTED COLUMN™ by placing a "C" in the Derivation Type column of the temporary column buffer. If condition 708 determines that the column is defined as a non-derived column by the inclusion of the "TYPE IS STANDARD" phrase in the definition text, control is passed to block 712, which registers the column as a non-derived column by placing an "S" in the Derivation Type column of the temporary column buffer. If Condition 706, condition 707, and condition 708 determine that a column derivation phrase was not included in the column definition text, control is passed to condition 703. Condition 703 then determines whether a user data type is specified in the column definition. If so, control is passed to block 702, which assumes the user data type derivation type for the column as if it had been included as a derivation type phrase in the column definition. Control is then passed back to condition 704, which will start the derivation type determination logic over again using the derivation type inherited from the user data type. If condition 703 determines that a user data type was not specified in the column definition, control is passed to block 712, which registers the column as a non-derived column by placing an "N" in the Derivation Type column of the temporary column buffer. After the derivation type is registered in block 710, block 711 or block 712, control is passed to condition 716. Condition 716 then determines whether the column has been defined as allowing multiple values by the inclusion of the "MULTIPLE VALUES ARE ALLOWED" phrase in the definition text. If so, an error is returned in block 717 because only PHANTOM COLUMNS™ may be defined as allowing multiple values. If condition 716 determines that the column is not defined as allowing multiple values, control is passed to block 715, which registers it as such by placing an "N" in the Multiple Value Indicator of the temporary column buffer. Control is then passed to the portion of the user data type definition process which is shown in FIG. 8B and represented in this flowchart as block 720.

FIG. 8B shows the portion of the column definition process that validates the derivation formula and derivation formula parameter values entered in the column definition. The portion of the Column Definition process shown in FIG. 8B is shown in flowchart form and is also represented as block 720 in FIG. 8A. In the preferred embodiment, derivation formulas and associated parameter value assignments are specified by the inclusion of the phrase "FORMULA IS formula-name. The name of the stored procedure or user-defined function containing the derivation formula replaces "formula-name" in the phrase. Assignments for derivation formula input parameters are accomplished by the inclusion of the phrase "parameter-name=assignment" for a particular column. The name of a parameter within the formula replaces "parameter-name" in the phrase. A valid parameter assignment value replaces "assignment" in the phrase. Multiple pairs of parameters and assignment values may be separated by commas.

Valid derivation formula parameter assignment values defined to a column are constants, system variable names, expressions, and column names from the table to which the column being modified will belong. The derivation formula and parameter assignment values may be inherited from a user data type specified in the column definition.

In FIG. 8B, Condition 731 determines whether the column is a non-derived column. If so, control is passed to condition 739 which determines whether a derivation formula has been specified in the column definition by the inclusion of the "FORMULA IS formula-name" phrase. If so, an error condition is indicated (block 741) because a derivation formula can not be specified for a non-derived column. If condition 739 determines that a derivation formula has not been specified, control is passed to block 744 which places a null entry in the Derivation Formula column of the temporary column buffer. Control is then passed to the portion of the column definition process which is shown in FIG. 8C and represented in this flowchart as block 746. If condition 731 determines that the column is a derived column, control is passed to condition 732. Condition 732 then determines whether a derivation formula has been specified in the column definition. If not, control is passed to condition 740, which determines whether a derivation formula exists for any user data type specified in the column definition. If not, an error condition is indicated in block 741 because derived columns must be associated with a derivation formula. If condition 740 determines that a derivation formula has been assigned to a user data type specified in the column definition, control is passed to block 736. Block 736 then assigns the derivation formula from the user data type to the column as if it had been entered in the column definition text. If condition 732 determines that a derivation formula has been entered in the column definition text, or if a derivation formula is inherited from a user data type in block 736, control is passed to block 733. Block 733 then retrieves the stored procedure from the catalog database. Control is then passed to condition 734, which determines whether an error was encountered while retrieving the stored procedure in block 733. If so, an error condition is indicated in (block 741). If the stored procedure was successfully retrieved, control is passed to condition 735, which determines whether the stored procedure retrieved is a derivation formula. If it is not, an error condition is indicated (block 741). If the stored procedure is a derivation formula, control is passed to condition 738. Condition 738 determines whether the derivation formula allows multiple values. If it does, control is passed to condition 737 which determines whether the Multiple Value Indicator column in the temporary column buffer indicates that the column allows multiple values. If it does not, the multiple value indicators of the derivation formula and the column are inconsistent and an error condition is indicated in (block 741). If condition 738 determines that the derivation formula does not allow multiple values or condition 737 determines that the column does allow multiple values, control is passed to condition 742. Condition 742 compares the system data type of the output parameter of the derivation formula with the system data type of the column. If condition 742 determines that the two are incompatible, an error condition is indicated (block 741). If they are compatible, control is passed to block 743, which places the name of the derivation formula into the Derivation Formula column of the temporary column buffer. Control is then passed to block 745, which parses the derivation parameters and assignment values included in the column definition text. Control is then passed to condition 750. Condition 750 determines whether a parameter included in the definition text is named as a parameter in the derivation formula. If it is not, an error condition is indicated in (block 741). If the parameter is included in the derivation formula, control is passed to condition 749, which determines whether the value assigned to the parameter is valid. If the value is a constant, it must be compatible with the data type of the parameter in the derivation formula. If the value is a system variable name, the system variable data type must be compatible with the data type of the parameter in the formula. If the value is an expression, the result of the expression must be compatible with the data type of the derivation formula parameter. If the value is a column name, the column data type must be compatible with the data type of the derivation formula parameter. If condition 749 determines that the value specified is incompatible, an error is returned in block 741. If the value is compatible, control is passed to block 748 which registers the parameter name and the assignment value in the temporary column buffer. Control is then passed to condition 747 which determines whether more parameters were defined which have not been processed. If so, control is passed back to condition 750. Condition 750 condition 749, block 748 and condition 747 are processed recursively until condition 747 determines that all parameters included in the definition text have been processed, or until an error is encountered. If condition 747 determines that all parameters specified in the definition have been processed, control is passed to the portion of the column definition process which is shown in FIG. 8C and represented in this flowchart as block 746.

FIG. 8C shows the portion of the column definition process which validates the derivation formula parameter assignment values for completeness and saves the column definition in the catalog database.

The portion of the Column Definition process in FIG. 8C is shown in flowchart form and is also represented as block 746 in FIG. 8B. In the preferred embodiment, required derivation formula parameters and their assignment values can be fully or partially inherited from a user data type specified in the column definition. In order to allow the database management system to automatically invoke derivation formulas, edits must be performed to ensure that all input parameters used by a derivation formula have an assignment value.

The assignment value can be made in the column definition, inherited from a user data type or included as a default in the derivation formula.

In FIG. 8C, Condition 761 determines whether the column specifies a derivation formula. This is accomplished by checking the Derivation Formula in the temporary column buffer. If the Derivation Formula column contains a null entry, control is passed to block 775, which saves the column definition into the catalog database from the temporary column buffer. If condition 761 determines that a derivation formula does exist for the column, control is passed to condition 762. Condition 762 determines whether the derivation formula for the column and the derivation formula for a user data type specified in the column definition are the same. If not, control is passed to block 771, which will begin the completeness test for derivation formula parameters. If the column and the user data type specify the same derivation formula, control is passed to condition 763, which determines whether a derivation formula parameter from the user data type is also specified in the column definition. If it is, control is passed to condition 766 bypassing inheritance of the parameter from the user data type. If condition 763 determines that a user data type parameter was not specified in the column definition, control passes to condition 764. Condition 764 determines whether the assignment value for the parameter in the user data type definition is an unqualified column name. If it is, control is passed to condition 768, which determines whether the column is defined, or is about to be defined, to the table to which the derived column being defined will belong. If not, an error condition is indicated in (block 770) because columns identified as parameter assignment values must exist on the same table as the derived column. If so, control is passed to condition 769, which determines whether the data type of the column that is to be used as an assignment value is compatible with the data type of the named input parameter of the derivation formula. If not, an error condition is indicated (block 770). If it is compatible, control is passed to block 767, which uses the table name to qualify the column in the parameter assignment value. If condition 764 determines that the parameter assignment value was not an unqualified column name or if block 767 qualifies the column in the parameter value, control is passed to block 765, which adds the parameter from the user data type and the assignment to the temporary column buffer for use in deriving the value column. If condition 763 determines that a parameter specified for the user data type already exists in the column definition or if the parameter is copied for the column in block 765 control is passed to condition 766. Condition 766 determines whether more parameters are defined for the user data type which have not been processed. If so, control is passed back to condition 763. Condition 763 through condition 766 are processed recursively until all parameters specified for the user data type have been processed or until an error is returned. If condition 762 determines that the derivation formulas on the user data type and the column are different or if condition 766 determines that all of the parameters specified for the user data type have been processed, control is passed to block 771. Block 771 retrieves the derivation formula from the catalog database. Control is then passed to condition 772, which determines whether a parameter named in the derivation formula parameter has an assignment value for the column. If so, control is passed to condition 774 to check for additional parameters. If condition 772 determines that a derivation formula parameter does not have an assignment, control is passed to condition 772. Condition 773 determines whether a default has been provided for the parameter in the derivation formula. If not, an error is returned in block 770 because no value would be assigned to the parameter during invocation.

If condition 772 determines that a derivation formula parameter has an assignment value in the column or if condition 773 determines that a default is provided for the parameter in the derivation formula, control is passed to condition 774. Condition 774 determines whether more parameters exist in the derivation formula which have not been processed.

If so, control is passed back to condition 772. Condition 772, condition 773 and condition 774 are processed recursively until all of the parameters in the derivation formula have been processed or until an error is returned. If condition 774 determines that all of the parameters in the derivation formula have been processed control is passed to block 775, which saves the column definition into the catalog database from the temporary column buffer.

A psueocode representation of the Column Definition Process flowchart shown in FIG. 8A, FIG. 8B and FIG. 8C follows:

COLUMN DEFINITION PROCESS

```
PERFORM EXISTING COLUMN DEFINITION LOGIC.
BEGIN-DEFINITION-LABEL. (PROCESSING LABEL ONLY)
IF 'TYPE IS PHANTOM' APPEARS IN COLUMN DEFINITION
    MOVE 'P' TO THE DERIVATION TYPE COLUMN
    IF 'MULTIPLE VALUES ARE ALLOWED' APPEARS IN THE DEFINITION
        MOVE 'Y' TO THE MULTIPLE VALUE INDICATOR COLUMN
    ELSE
        IF 'MULTIPLE VALUES ARE NOT ALLOWED' APPEARS IN THE
DEFINITION
            MOVE 'N' TO THE MULTIPLE VALUE INDICATOR COLUMN
        ELSE
            IF A USER DATA TYPE IS SPECIFIED IN THE DEFINITION
                COPY THE MULTIPLE VALUE INDICATOR FROM THE USER
```

-continued

| COLUMN DEFINITION PROCESS |
|---|

```
DATA TYPE
            ELSE
                MOVE 'N' TO THE MULTIPLE VALUE INDICATOR COLUMN
            END-IF
        END-IF
    END-IF
ELSE
    IF TABLE IS A PHANTOM TABLE ™ (TABLE TYPE = 'P')
        RETURN ERROR (PHANTOM TABLE ™ MAY ONLY HAVE PHANTOM
COLUMNS ™)
    END-IF
    IF 'TYPE IS INITIALLY DEFAULTED' APPEARS IN THE DEFINITION
        MOVE 'I' TO THE DERIVATION TYPE COLUMN
    ELSE
        IF 'TYPE IS CONTINUOUSLY DEFAULTED' APPEARS IN THE
DEFINITION
            MOVE 'C' TO THE DERIVATION TYPE COLUMN
        ELSE
            IF 'TYPE IS NON DERIVED' APPEARS IN THE DEFINITION
                MOVE 'N' TO THE DERIVATION TYPE COLUMN
            ELSE
                IF THERE IS A USER DATA TYPE
                    MOVE UDT DERIVATION TYPE TO COLUMN DERIVATION
TYPE
                    GO TO BEGIN-DEFINITION-LABEL (REPROCESS USING
INHERITED VALUE)
                ELSE
                    MOVE 'N' TO THE DERIVATION TYPE COLUMN
                END-IF
            END-IF
        END-IF
    END-IF
    IF 'MULTIPLE VALUES ARE ALLOWED' APPEARS IN THE COLUMN
DEFINITION
        RETURN ERROR (ONLY PHANTOM COLUMNS ™ MAY SPECIFY MULTIPLE
VALUES)
    ELSE
        MOVE 'N' TO MULTIPLE VALUE INDICATOR
    END-IF
END-IF.
IF DERIVATION-TYPE = 'N'
    IF 'FORMULA IS . . . ' PHRASE APPEARS IN DEFINITION TEXT
        RETURN ERROR (ONLY DERIVED COLUMNS MAY SPECIFY A
FORMULA)
    ELSE
        MOVE NULL ENTRY TO DERIVATION FORMULA
    END-IF
ELSE
    IF 'FORMULA IS . . . ' PHRASE DOES NOT APPEAR IN DEFINITION
TEXT
        IF USER DATA TYPE DERIVATION FORMULA IS NOT NULL
            USE UDT DERIVATION FORMULA AS COLUMN DERIVATION
FORMULA
        ELSE
            RETURN ERROR (DERIVED COLUMNS MUST HAVE A FORMULA)
        END-IF
    END-IF
    RETRIEVE STORED PROCEDURE USING DERIVATION FORMULA NAME
    IF THE STORED PROCEDURE COULD NOT BE FOUND
        RETURN ERROR (DERIVATION FORMULA DOES NOT EXIST)
    END-IF
    IF THE STORED PROCEDURE IS NOT A FORMULA
        RETURN ERROR (STORED PROCEDURE IS NOT A FORMULA)
    END-IF
    IF IT IS A MULTIPLE VALUE FORMULA
        IF THE COLUMN DOES NOT ALLOW MULTIPLE VALUES
            RETURN ERROR (MULTIPLE VALUES INDICATORS ARE
INCONSISTENT)
        END-IF
    END-IF
    IF THE FORMULA OUTPUT PARAMETER IS INCONSISTENT WITH THE
COLUMN
        RETURN ERROR (OUTPUT PARAMETER IS INCONSISTENT WITH
COLUMN)
    END-IF
    MOVE THE DERIVATION FORMULA NAME TO THE DERIVED COLUMN
FORMULA NAME
```

-continued

| COLUMN DEFINITION PROCESS |
|---|
| PARSE THE PARAMETERS AND VALUES IN THE DEFINITION |
| REPEAT FOR ALL PARAMETERS IN THE COLUMN DEFINITION |
|     IF THE PARAMETER DOES NOT APPEAR IN THE FORMULA |
|         RETURN ERROR (PARAMETER DOES NOT APPEAR IN FORMULA) |
|     END-IF |
|     IF THE PARAMETER VALUE IS A CONSTANT |
|     AND IT IS INCONSISTENT WITH THE FORMULA PARAMETER DATA TYPE |
|         RETURN ERROR (VALUE IS INCONSISTENT WITH FORMULA PARAMETER) |
|     END-IF |
|     IF THE PARAMETER VALUE IS A SYSTEM VARIABLE NAME |
|     AND ITS DATA TYPE IS INCONSISTENT WITH THE FORMULA PARAMETER |
|         RETURN ERROR (VALUE IS INCONSISTENT WITH FORMULA PARAMETER) |
|     END-IF |
|     IF THE PARAMETER VALUE IS A FULLY QUALIFIED COLUMN NAME |
|     AND THE COLUMN DATA TYPE IS INCONSISTENT WITH THE PARAMETER |
|         RETURN ERROR (VALUE IS INCONSISTENT WITH FORMULA PARAMETER) |
|     END-IF |
|     IF THE PARAMETER VALUE IS NOT ONE OF THE ABOVE TYPES |
|         RETURN ERROR (PARAMETER VALUE IS INVALID) |
|     END IF |
|     MOVE THE PARAMETER NAME AND THE VALUE TO THE TEMPORARY COLUMN BUFFER |
|     END-REPEAT. |
| END-IF. |
| IF THE DERIVATION FORMULA DOES NOT CONTAIN A NULL ENTRY |
|     IF THE COLUMN DERIVATION FORMULA = THE USER DATA TYPE FORMULA |
|         REPEAT FOR EACH PARAMETER IN THE USER DATA TYPE |
|             IF THE UDT PARAMETER IS NOT SPECIFIED FOR THE COLUMN |
|                 IF THE UDT PARAMETER IS AN UNQUALIFIED COLUMN NAME |
|                     IF THE COLUMN NAME DOES NOT EXIST IN THE TABLE |
|                         RETURN ERROR (COLUMN DOES NOT EXIST IN TABLE) |
|                     ELSE |
|                         IF THE COLUMN DATA TYPE IS INCONSISTENT |
|                             RETURN ERROR (COLUMN DATA TYPE IS INCONSISTENT) |
|                         ELSE |
|                             USE THE TABLE NAME TO QUALIFY THE COLUMN NAME |
|                         END-IF |
|                   END-IF |
|               END-IF |
|               COPY THE UDT PARAMETER AND VALUE FOR THE COLUMN |
|             END-IF |
|         END-REPEAT |
|     END-IF |
|     RETRIEVE THE DERIVATION FORMULA |
|     REPEAT FOR EACH PARAMETER IN THE DERIVATION FORMULA |
|         IF THE FORMULA PARAMETER IS NOT NAMED IN THE COLUMN |
|             IF A DEFAULT VALUE DOES NOT EXIST IN THE FORMULA |
|                 RETURN ERROR (FORMULA PARAMETER HAS NO ASSIGNED VALUE) |
|             END-IF |
|         END-IF |
|     END-REPEAT |
| END-IF |
| SAVE THE COLUMN DEFINITION AND ANY PARAMETER VALUES ASSIGNED |
| RETURN. (COLUMN DEFINITION COMPLETED SUCCESSFULLY) |

Insert Process

Figure 9:
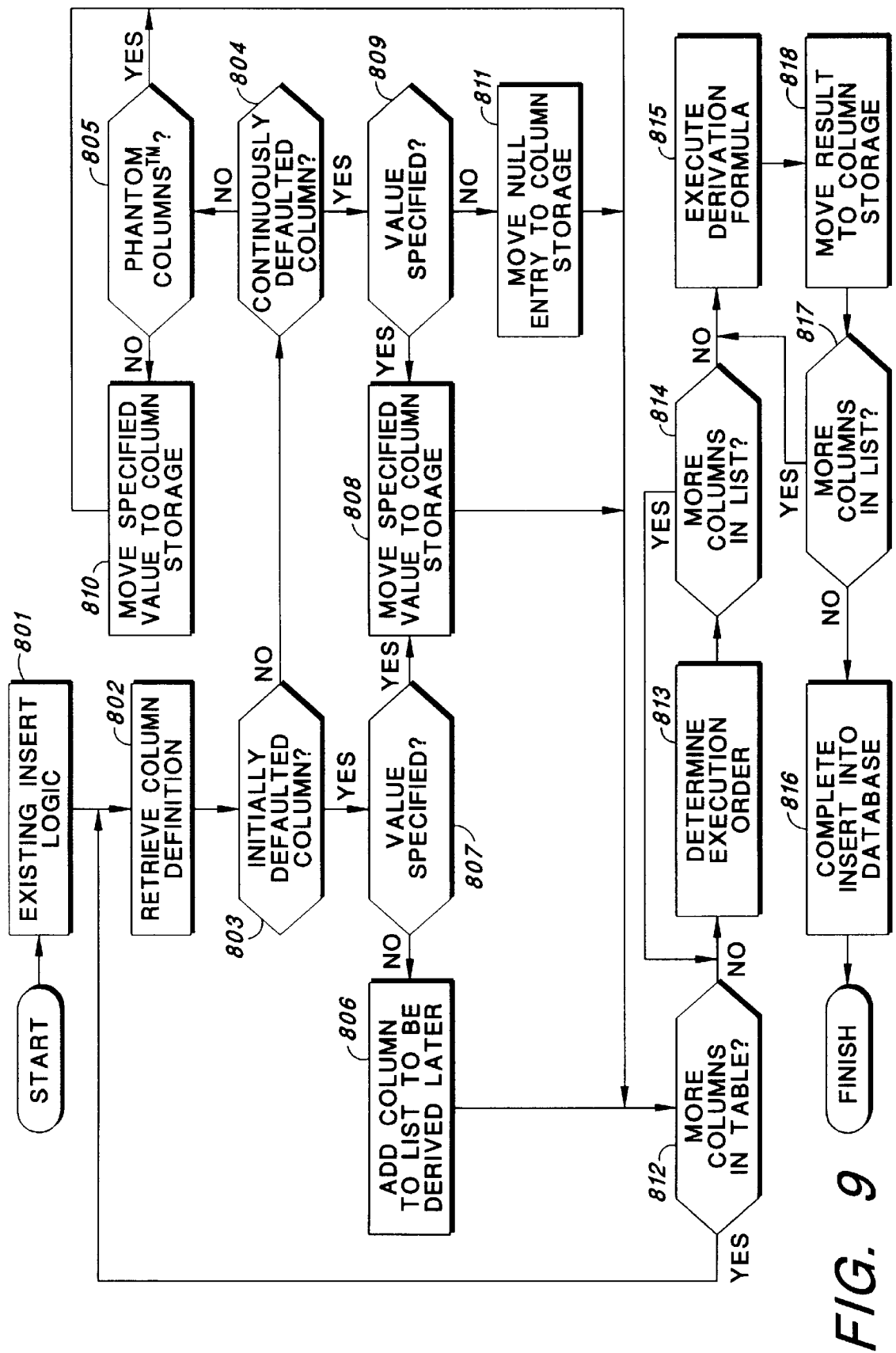
FIG. 9 is a flowchart showing the logic added to the insert process in the preferred embodiment.

Referring to FIG. 9, the insert process in the preferred embodiment is shown in flowchart form. The existing insert process is modified to derive values for initially defaulted columns and to bypass PHANTOM COLUMNS™. In the preferred embodiment, the values of columns defined as initially defaulted are derived if a value is not supplied for them during the insertion of a row into the table on which they reside. A list of the initially defaulted columns that are to be derived is compiled. A derivation order of those columns is then determined based on any dependencies between them. The derivation formulas are then invoked and the values returned are assigned as the values of the initially defaulted columns. In the preferred embodiment, PHANTOM COLUMNS™ do not have database storage space. Attempts to insert values for PHANTOM COLUMNS™ are ignored by the insert process, but are allowed so that insert trigger procedures may react to the values supplied.

The Existing Insert Logic 801 executes and control is then passed to block 802, which retrieves the definition from the database management system catalog for a column from the table being inserted. After it has been retrieved, control is passed to condition 803, which determines whether the column is an initially defaulted column. If it is, control is passed to condition 807, which determines whether a value has been specified for the initially defaulted column. If a value has been specified, control is passed to block 808, which places the specified value in the column buffer for the row. Control is then passed to condition 812, which checks for additional columns in the table. If condition 807 determines that a value has not been specified for an initially defaulted column, control is passed to block 806, which adds the name of the column to a list of initially defaulted columns that will be derived later. Control is then passed to condition 812, which checks for more columns in the table. If condition 803 determines that the column is not an initially defaulted column, control is passed to condition 804, which determines whether the column is a CONTINUOUSLY DEFAULTED COLUMN™. If it is, control is passed to condition 809, which determines whether a value has been specified for the CONTINUOUSLY DEFAULTED COLUMN™. If it has, control is passed to block 808, which places the specified value in the column buffer for the row. Control is then passed to condition 812, which checks for more columns in the table. If condition 809 determines that a value has not been specified for the CONTINUOUSLY DEFAULTED COLUMN™, control is passed to block 811, which places a null entry in the column buffer for the row. Control is then passed to condition 812, which checks for more columns in the table. If condition 804 determines that the column is not a CONTINUOUSLY DEFAULTED COLUMN™, control is passed to condition 805, which determines whether the column is a PHANTOM COLUMN™. If it is, no values will be assigned and control is passed directly to condition 812, which checks for more columns in the table. If condition 805 determines that the column is not a PHANTOM COLUMN™, the column is assumed to be of the standard type and control is passed to block 810, which moves the value specified to the column buffer for the row. Control is then passed to condition 812, which checks for more columns in the table.

When condition 812 receives control, it determines whether there are any columns remaining in the table which have not been processed. If so control is passed back to block 802. Block 802 through condition 812 are processed recursively until condition 812 determines that all of the columns in the table have been processed. When this occurs, control is passed to block 813, which orders the initially defaulted columns in the list to be derived based upon any dependency that they may have upon each other. If one of the initially defaulted columns lists another as a derivation formula parameter assignment value, the column it is dependent upon must be derived first. After block 813 places the initially defaulted column in the proper order in the list, control is passed to condition 814. Condition 814 then determines whether there are more initially defaulted columns in the list of columns to be derived which have not been placed in the proper order. If there are, control is passed back to block 813 to process the remaining columns. Block 813 and condition 814 are processed recursively until condition 814 determines that all of the initially defaulted columns in the list to be derived have been placed in the proper order. When this occurs, control is passed to block 815. Block 815 invokes the derivation formula named in the column definition for the initially defaulted column. Any derivation formula parameter assignment values are used while invoking the formula. After execution of the formula is complete, control is passed to block 818, which moves the result of the derivation formula to the column buffer for the row. Control is then passed to condition 817, which determines whether more initially defaulted columns are on the list to be derived. If so, control is passed back to block 815. Block 815, block 818, and condition 817 are processed recursively until condition 817 determines that all initially defaulted columns in the list have been derived. When this occurs, control is passed to block 816, which creates the new row in database storage from the row buffer.

A psuedocode representation of the Insert Process flowchart shown in FIG. 9 follows:

---

INSERT PROCESS

---

```
PERFORM EXISTING INSERT PROCESS LOGIC.
REPEAT FOR EACH COLUMN IN THE TABLE BEING INSERTED
    RETRIEVE THE COLUMN DEFINITION FROM THE CATALOG DATABASE
    IF THE COLUMN IS INITIALLY DEFAULTED
        IF A VALUE HAS BEEN SPECIFIED FOR INSERT
            MOVE THE VALUE SPECIFIED TO THE COLUMN BUFFER
        ELSE
            ADD THE COLUMN NAME TO THE LIST TO BE DERIVED
        END-IF
    ELSE
        IF THE COLUMN IS CONTINUOUSLY DEFAULTED
            IF A VALUE HAS BEEN SPECIFIED FOR INSERT
                MOVE THE VALUE SPECIFIED TO THE COLUMN BUFFER
            ELSE
                MOVE NULL ENTRY TO THE COLUMN BUFFER
            END-IF
        ELSE
            IF THE COLUMN IS NOT A PHANTOM COLUMN ™
                MOVE THE VALUE SPECIFIED TO THE COLUMN BUFFER
            END-IF
        END-IF
    END-IF
END-REPEAT.
REPEAT FOR EACH INITIALLY DEFAULTED COLUMN IN THE LIST TO BE
DERIVED
```

| INSERT PROCESS |
|---|
| IF THE COLUMN IS DEPENDENT UPON ANOTHER IN THE LIST<br>    MOVE IT AFTER THE COLUMN THAT IT IS DEPENDENT UPON<br>  END-IF<br>END-REPEAT.<br>REPEAT FOR EACH INITIALLY DEFAULTED COLUMN IN THE LIST TO BE DERIVED<br>    EXECUTE THE DERIVATION FORMULA USING ANY PARAMETER ASSIGNMENT VALUES<br>    MOVE THE RESULT TO THE COLUMN BUFFER<br>END-REPEAT.<br>END-REPEAT.<br>CREATE THE NEW ROW IN THE DATABASE FROM THE ROW BUFFER.<br>RETURN. (INSERT COMPLETED SUCCESSFULLY) |

Update Process

Figure 10:
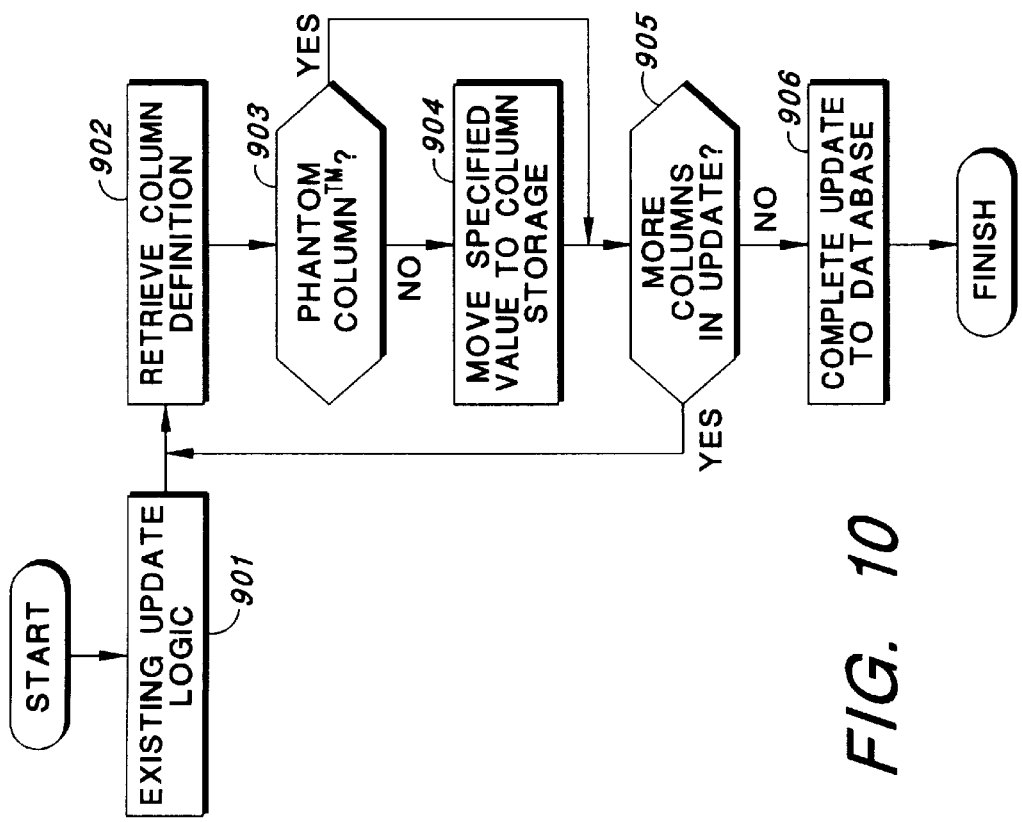
FIG. 10 is a flowchart showing the logic added to the update process in the preferred embodiment.

Referring to FIG. 10, the update process in the preferred embodiment is shown in flowchart form. The existing update process is modified to bypass PHANTOM COLUMNS™. In the preferred embodiment, PHANTOM COLUMNS™ do not have database storage space. Attempts to update values for PHANTOM COLUMNS™ are ignored by the update process, but are allowed so that update trigger procedures may react to the values supplied.

The Existing Insert Logic 901 executes and control is then passed to block 902, which retrieves the definition from the database management system catalog for a column specified for update. After it has been retrieved, control is passed to condition 903, which determines whether the column is a PHANTOM COLUMNS™. If it is, the column is ignored and control is passed to condition 905, which determines whether there are additional columns specified for update which have not been processed. If condition 903 determines that the column is not a PHANTOM COLUMN™, control is passed to block 904, which moves the value specified to the column buffer for the row being updated. Control is then passed to condition 905 to check for more columns. When condition 905 gets control, it determines whether there are additional columns specified for update which have not been processed. If so, control is passed back to block 902, Block 902, Condition 903, block 904, and condition 905 are processed recursively until condition 905 determines that all of the columns specified for update have been processed. When this occurs, control is passed to block 906, which updates the row in database storage using the value from the row buffer.

A psuedocode representation of the Update Process flowchart shown in FIG. 10 follows:

Stored Procedure Execution Process

Figure 11:
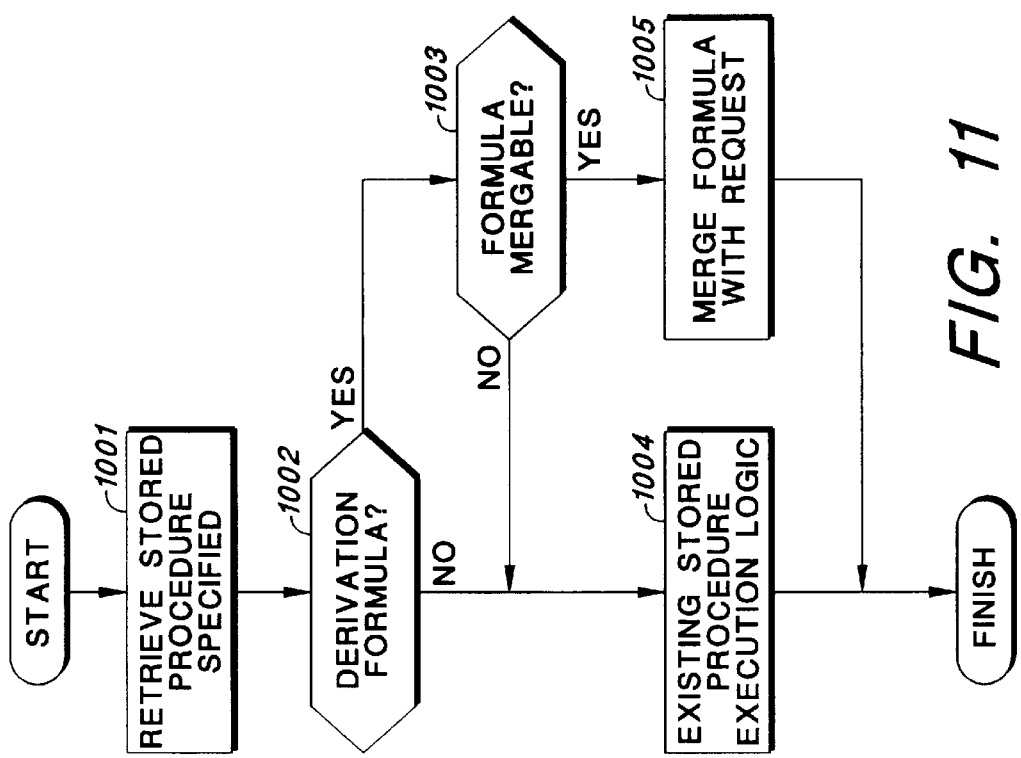
FIG. 11 is a flowchart showing the logic added to the stored procedure execution process in the preferred embodiment.

Referring to FIG. 11, the stored procedure execution process in the preferred embodiment is shown in flowchart form. The existing stored procedure execution process is modified to merge derivation formulas with the original requests which contain the stored procedure execution command. In the preferred embodiment, derivation formulas may be executed directly as if they were standard stored procedures. In this manner, derivation formulas may be invoked directly by requesters and may have uses other than the derivation of database table column values. Because of the strict editing performed on derivation formulas, there is a higher likelihood that they can be merged with the original request through the view decomposition process described in U.S. Pat. No. 5,276,870, to Shan et al., (1994) or a similar technique such as that known as "query rewrite" found in active database management systems.

Block 1001 retrieves the stored procedure referenced in the request from the catalog database. Control is then passed to condition 1002, which determines whether the stored procedure is a derivation formula. If so, control is passed to condition 1003, which determines whether the derivation formula can be merged with the original request. If it can, control is passed to block 1005, which merges the text of the derivation formula with the original request which may then be executed. If condition 1003 determines that the derivation formula cannot be merged with the original request, control is passed to block 1004, which performs the existing stored procedure execution logic treating the derivation formula as if it were a standard stored procedure. If condition 1002 determines that the stored procedure is not a derivation formula, control is passed to block 1004, which performs the existing stored procedure execution logic for the standard stored procedure.

A psuedocode representation of the Stored Procedure Execution Process flowchart shown in FIG. 11 follows:

| UPDATE PROCESS |
|---|
| PERFORM EXISTING UPDATE PROCESS LOGIC.<br>REPEAT FOR EACH COLUMN SPECIFIED FOR UPDATE<br>    RETRIEVE THE COLUMN DEFINITION FROM THE CATALOG DATABASE<br>    IF THE COLUMN IS NOT A PHANTOM COLUMN ™<br>      MOVE THE VALUE SPECIFIED TO THE COLUMN BUFFER<br>    END-IF<br>MODIFY THE ROW IN THE DATABASE FROM THE ROW BUFFER.<br>RETURN. (UPDATE COMPLETED SUCCESSFULLY) |

| STORED PROCEDURE EXECUTION PROCESS |
|---|
| RETRIEVE THE STORED PROCEDURE FROM THE CATALOG DATABASE |
| IF THE STORED PROCEDURE IS A DERIVATION FORMULA |
|     IF THE DERIVATION FORMULA IS MERGEABLE |
|         MERGE THE DERIVATION FORMULA WITH THE ORIGINAL REQUEST |
|     ELSE |
|         EXECUTE THE DERIVATION FORMULA AS A STANDARD STORED PROCEDURE |
|     END-IF |
| ELSE |
|     EXECUTE THE STANDARD STORED PROCEDURE |
| END-IF |
| RETURN. (STORED PROCEDURE EXECUTION COMPLETED) |

Retrieval Process

Figure 12B:
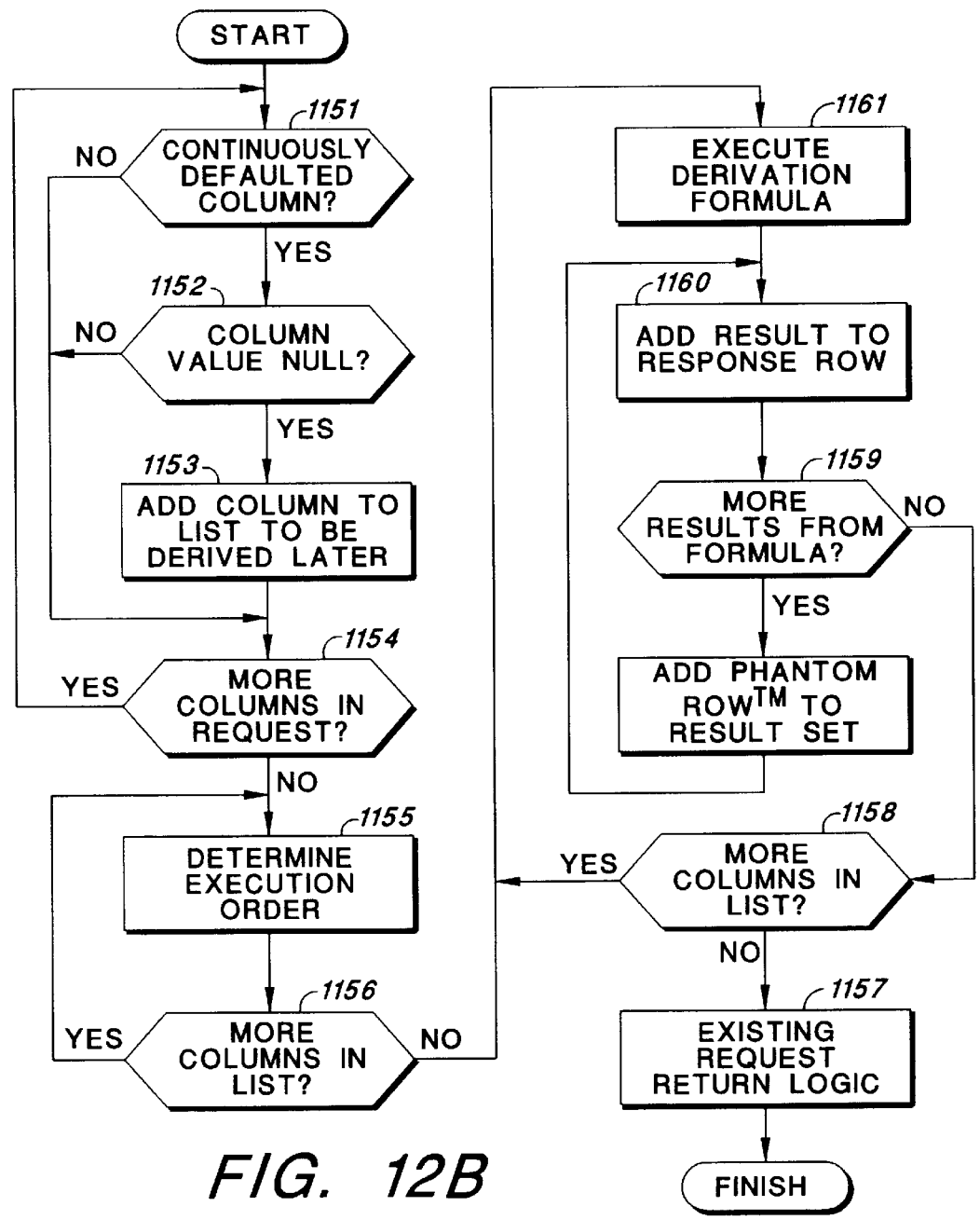
FIGS. 12A and 12B are flowcharts showing the logic added to the retrieval process in the preferred embodiment.
Figure 12A:
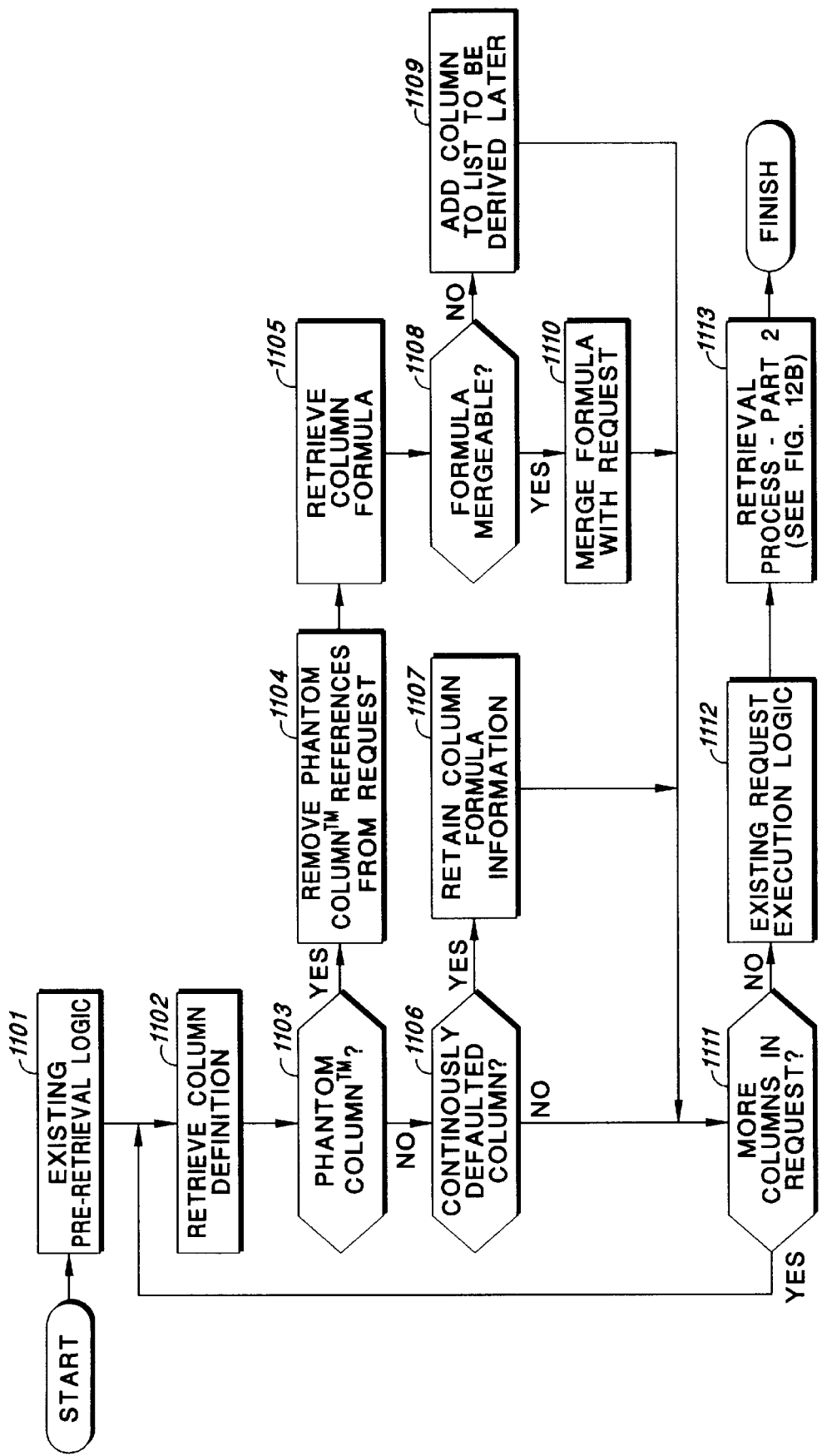

Referring to FIG. 12A and FIG. 12B, the database retrieval process in the preferred embodiment is shown in flowchart form. The existing database retrieval process is modified to automatically derive CONTINUOUSLY DEFAULTED COLUMNS™ in some cases and PHANTOM COLUMNS™ in all cases. In the preferred embodiment, CONTINUOUSLY DEFAULTED COLUMNS™ are derived during retrieval if a null entry is found in database storage for the column. PHANTOM COLUMNS™ are retrieved whenever their values are requested. PHANTOM COLUMNS™ may also represent a set of similar values. An additional result set row is created for each additional value returned from the derivation formula invoked for a multiple value PHANTOM COLUMN™. The result set rows combine the values of the original result set row with each result from the PHANTOM COLUMN™ derivation formula. In this way, multiple result set rows may be created from a single database row.

The flowchart in FIG. 12A shows the portion of the database retrieval process which modifies the original request prior to its execution. PHANTOM COLUMN™ references are removed from the original request. Either PHANTOM COLUMN™ derivation formulas are merged with the original request or the PHANTOM COLUMN™ names are added to a list of columns to be derived later. Derivation formula information associated with CONTINUOUSLY DEFAULTED COLUMNS™ is retained for use in the event that a null entry is retrieved from the database for the column. The existing request execution logic is then performed to retrieve values from the database.

In FIG. 12A, the existing database pre-retrieval logic 1101 executes and control is passed to block 1102. Block 1102 retrieves the column definition from the catalog database for a column named in the request. Control is then passed to condition 1103, which determines whether the column is a PHANTOM COLUMN™. If it is, control is passed to block 1104, which removes the reference to the PHANTOM COLUMN™ from the original request. This is done to prevent an attempt to retrieve PHANTOM COLUMN™ values which do not exist in database storage. After the PHANTOM COLUMN™ reference is removed, control is passed to block 1105, which retrieves the derived formula associated with the PHANTOM COLUMN™ from the catalog database. Control is then passed to condition 1108, which determines whether the derivation formula can be merged with the original request to achieve the desired results. If so, control is passed to block 1110, which merges the derivation formula with the original request. After this has been accomplished, control is passed to condition 1111, which checks for additional columns in the request. If condition 1108 determines that the derivation formula cannot be merged with the original request, control is passed to block 1109, which adds the PHANTOM COLUMN™ to a list of columns which will be derived later. Control is then passed to condition 1111, which checks for additional columns in the request. If condition 1103 determines that the column is not a PHANTOM COLUMN™, control is passed to condition 1106. Condition 1106 determines whether the column is a CONTINUOUSLY DEFAULTED COLUMN™. If so, control is passed to block 1107, which retains the derivation formula name and any derivation formula parameter assignment values for later use. Control is then passed to condition 1111, which checks for additional columns in the request. If condition 1106 determines that the column is not a CONTINUOUSLY DEFAULTED COLUMN™, control is passed directly to condition 1111, which checks for additional columns in the request. When condition 1111 gets control, it determines whether there are any columns named in the request which have not been processed. If so, control is passed back to block 1102. Block 1102 through condition 1111 are processed recursively until condition 1111 determines that all of the columns named in the request have been processed. When this occurs, control is passed to block 1112, which performs the existing database request execution logic. The existing logic will retrieve the information from the database as specified in the modified request including any PHANTOM COLUMN™ retrieval logic that has been merged with the original request. After this has been accomplished, control is passed to the portion of the retrieval process which is shown in FIG. 12B and represented in this flowchart as block 1113.

The flowchart in FIG. 12B shows the portion of the database retrieval process which derives the values of CONTINUOUSLY DEFAULTED COLUMNS™ for which a null entry was retrieved from the database and PHANTOM COLUMNS™ which could not be merged with the original request. CONTINUOUSLY DEFAULTED COLUMNS™ named in the request are processed to determine whether a null entry was retrieved from the database. If so, they are added to the list of columns that must be derived. Columns that remain to be derived are placed in derivation order based on their dependencies upon each other. The derivation formulas are then invoked and the resulting values are placed in the result set. PHANTOM ROWS™ are created in the event that multiple values are returned from the execution of a derivation formula for a PHANTOM COLUMN™.

In FIG. 12B, condition 1151 determines whether a column in the request is defined as continuously defaulted. If so, control is passed to condition 1152, which determines whether a null entry was retrieved from database storage for the CONTINUOUSLY DEFAULTED COLUMN™. If a null entry was returned, control is passed to block 1153, which adds the name of the CONTINUOUSLY DEFAULTED COLUMN™ to the list of columns to be derived later. Control is then passed to condition 1154, which checks for additional columns in the request. If condition 1152 determines that a non-null entry was retrieved from database storage for the column, control is passed directly to condition 1154, which checks for additional columns. If condition 1151 determines that the column is not a CONTINUOUSLY DEFAULTED COLUMN™, control is passed directly to condition 1154, which checks for additional columns. When condition 1154 gets control, it determines whether there are columns specified in the request which have not been processed. If so, control is passed back to condition 1151. Condition 1151 through condition 1154 are processed recursively until condition 1154 determines that all columns specified in the request have been processed. When condition 1154 determines that all columns have been processed, control is passed to block 1155. Block 1155 orders the columns in the list of columns that remain to be derived based upon the dependency that they may have upon each other. If one of the derived columns lists another as a derivation formula parameter assignment value, the column that it is dependent upon must be derived first. After block 1155 places the derived column in the proper order in the list, control is passed to condition 1156. Condition 1156 then determines whether there are more derived columns in the list which have not been placed in the proper order. If there are, control is passed back to block 1155. Block 1155 and condition 1156 are processed recursively until all of the derived columns in the list have been placed in the proper derivation order. When this occurs, control is passed to block 1161, which executes the derivation formula associated with a column from the list to be derived using any parameter assignment values associated with the column. After this is accomplished, control is passed to block 1160, which adds the result of the derivation formula to the column buffer in the result set row. Control is then passed to condition 1159, which determines whether there are additional values returned from the execution of the derivation formula which have not been added to a result set row. If this is the case, control is passed to block 1162, which uses the original row in the result set to create an additional PHANTOM ROW™ in the result set. After this is accomplished, control is passed back to block 1160. Block 1160, condition 1159, and block 1162 are processed recursively until all of the values returned from the derivation formula have been added to a row in the result set. When condition 1159 determines that all of the values have been added to the result set, control is passed to condition 1158, which determines whether there are additional columns in the list to be derived which have not been processed. If so, control is passed back to block 1161. Block 1161 through condition 1158 are processed recursively until all of the columns in the list have been derived and all of the resulting values have been placed in the result set. When condition 1158 determines that all of the columns in the list have been processed, control is passed to block 1157, which executes the existing logic that returns the result set to the requester.

A psuedocode representation of the Database Retrieval Process flowchart shown in FIG. 12A and FIG. 12B follows:

```
DATABASE RETRIEVAL PROCESS

PERFORM THE EXISTING DATABASE PRE-RETRIEVAL LOGIC
REPEAT FOR EACH COLUMN NAMED IN THE REQUEST
    RETRIEVE THE COLUMN DEFINITION FROM THE CATALOG DATABASE
    IF THE COLUMN IS A PHANTOM COLUMN ™
        REMOVE THE REFERENCES TO THE PHANTOM COLUMN ™ FROM THE
ORIGINAL REQUEST
        RETRIEVE THE DERIVATION FORMULA ASSOCIATED WITH THE
PHANTOM COLUMN ™
            IF THE FORMULA CAN BE MERGED WITH THE ORIGINAL REQUEST
                MERGE THE DERIVATION FORMULA WITH THE ORIGINAL
REQUEST
            ELSE
                ADD PHANTOM COLUMN ™ NAME TO THE LIST OF COLUMNS TO
BE DERIVED LATER
            END-IF
        ELSE
            IF THE COLUMN IS A CONTINUOUSLY DEFAULTED COLUMN ™
                RETAIN THE COLUMN DERIVATION FORMULA INFORMATION
FOR LATER USE
            END-IF
        END-IF
END-REPEAT
PERFORM THE EXISTING RETRIEVAL EXECUTION LOGIC
REPEAT FOR EACH COLUMN NAMED IN THE REQUEST
    IF THE COLUMN IS A CONTINUOUSLY DEFAULTED COLUMN ™
        IF THE VALUE RETURNED FOR THE COLUMN IS A NULL ENTRY
            ADD THE COLUMN NAME TO THE LIST OF COLUMNS TO BE
DERIVED LATER
        END-IF
    END-IF
END-REPEAT
REPEAT FOR EACH COLUMN IN THE LIST OF COLUMNS TO BE DERIVED
    IF THE COLUMN IS DEPENDENT UPON OTHER COLUMNS ™ IN THE LIST
        MOVE IT AFTER THE COLUMNS THAT IT IS DEPENDENT UPON IN
THE LIST
    END-IF
END-IF
```

-continued

| DATABASE RETRIEVAL PROCESS |
|---|
| REPEAT FOR EACH COLUMN IN THE LIST OF COLUMNS TO BE DERIVED<br>    EXECUTE THE DERIVATION FORMULA FOR THE COLUMN USING ANY ASSIGNMENT VALUES<br>    REPEAT FOR EACH VALUE RESULTING FROM DERIVATION FORMULA EXECUTION<br>        ADD THE FORMULA RESULT TO THE RESULT SET ROW<br>        IF THERE ARE MORE VALUES WHICH RESULTED FROM THE DERIVATION FORMULA<br>            ADD A PHANTOM ROW TO THE RESULT SET<br>        END-IF<br>    END-REPEAT<br>END-REPEAT<br>PERFORM EXISTING LOGIC WHICH RETURNS THE RESULT SET TO THE REQUESTER<br>RETURN. (DATABASE REQUEST PROCESS COMPLETED) |

It will be appreciated by those of ordinary skill in the art that many variations of the present invention are possible. For example, derivation formulas could be defined to the database management system in a way that does not require the use of stored procedures; derivation formulas could be defined so as not to allow that multiple values be a result of their invocation; derivation types in addition to the PHANTOM COLUMN™ type, initially defaulted type, and continuously defaulted type described could be defined allowing the database management system to automatically derive the value of table columns under additional circumstances, such as during the execution of an update command; derivation formulas could be of any format that results in a single value or a set of values when executed and is not limited to those formats specifically described; derivation formulas could be created which allow multiple dissimilar values to be returned and used for automatic data item derivation; derivation formulas could be associated with data items through a means independent of their definition; derivation formula parameter assignment values for table columns could also be made through a means independent of data item definition.

Thus, the scope of the invention should be determined by the appended claims and their legal equivalents, rather than by the examples given. All changes that come within the meaning and range of equivalency of the claims are intended to be embraced therein.

What is claimed is:

1. A system for automatic value derivation in a database comprising:
    a storage device for storing a database;
    a processor coupled to the storage device, the processor including a database management system comprising:
        means for defining a derived data item to the database management system;
        means for defining a derivation formula independently of the derived data item to the database management system;
        means for associating the derivation formula with the derived data item;
        means for executing said derivation formula associated with said derived data item and for generating a result of said derivation formula having been executed; and
        means for assigning the result of said derivation formula as a value of said derived data item;
        means for defining a derivation characteristic to said database management system; and
        means for associating the derivation characteristic with said derived data item, said derivation characteristic including a derivation type used to indicate the conditions under which said database management system will signal said means for executing to execute said derivation formula associated with said derived data item;
        said derivation type identifies said derived data item as being of a type to be derived by said database management system during retrieval of said value of said derived data item from said database.

2. The system of claim 1 wherein:
    said storage device does not store the value of said derived data item in said database.

3. The system of claim 1 further comprising:
    means for detecting whether said value of said derived data item is a prescribed value signifying that said result of said derivation formula should be assigned as said value of said derived data item;
    said means for assigning including means for assigning the result of said derivation formula as said value of said derived data item only in the event said means for detecting determines that said value of said derived data item is the prescribed value.

4. A system for automatic value derivation in a database comprising:
    a storage device for storing a database;
    a processor coupled to the storage device, the processor including a database management system comprising:
        means for defining a derived data item to the database management system;
        means for defining a derivation formula independently of the derived data item to the database management system;
        means for associating the derivation formula with the derived data item;
        means for executing said derivation formula associated with said derived data item and for generating a result of said derivation formula having been executed; and
        means for assigning the result of said derivation formula as a value of said derived data item;
        means for defining a derivation characteristic to said database management system; and
        means for associating the derivation characteristic with said derived data item, said derivation characteristic including a derivation type used to indicate the conditions under which said database management system will signal said means for executing to execute said derivation formula associated with said derived data item;

said derivation type identifies said derived data item as being of a type to be derived by said database management system during insertion of said value of said derived data item into said database.

5. A system for automatic value derivation in a database comprising:

a storage device for storing a database;

a processor coupled to the storage device, the processor including a database management system comprising:

means for defining a derived data item to the database management system;

means for defining a derivation formula independently of the derived data item to the database management system;

means for associating the derivation formula with the derived data item;

means for executing said derivation formula associated with said derived data item and for generating a result of said derivation formula having been executed; and means for assigning the result of said derivation formula as a value of said derived data item;

means for defining a derivation characteristic to said database management system;

means for associating the derivation characteristic with said derived data item, said derivation characteristic including a derivation type used to indicate the conditions under which said database management system will signal said means for executing to execute said derivation formula associated with said derived data item; and means for defining a derived user data type to said database management system as a template;

said means for associating said derivation characteristic with said derived data item including means for referring to the template for the purpose of defaulting said derivation characteristic.

6. A system for automatic value derivation in a database comprising:

a storage device for storing a database;

a processor coupled to the storage device, the processor including a database management system comprising:

means for defining a derived data item to the database management system;

means for defining a derivation formula independently of the derived data item to the database management system;

means for associating the derivation formula with the derived data item;

means for executing said derivation formula associated with said derived data item and for generating a result of said derivation formula having been executed; and means for assigning the result of said derivation formula as a value of said derived data item;

means for defining a derivation characteristic to said database management system; and means for associating the derivation characteristic with said derived data item, said derivation characteristic including a derivation type used to indicate the conditions under which said database management system will signal said means for executing to execute said derivation formula associated with said derived data item;

said means for defining a derivation characteristic to said database management system includes means for defining a multiple value derivation formula indicator to said database management system, said multiple value derivation formula indicator indicating whether said derivation formula is capable of returning a set of result values.

7. A system for automatic value derivation in a database comprising:

a storage device for storing a database;

a processor coupled to the storage device, the processor including a database management system comprising:

means for defining a derived data item to the database management system;

means for defining a derivation formula independently of the derived data item to the database management system;

means for associating the derivation formula with the derived data item;

means for executing said derivation formula associated with said derived data item and for generating a result of said derivation formula having been executed; and means for assigning the result of said derivation formula as a value of said derived data item;

means for defining a derivation characteristic to said database management system;

means for associating the derivation characteristic with said derived data item, said derivation characteristic including a derivation type used to indicate the conditions under which said database management system will signal said means for executing to execute said derivation formula associated with said derived data item; and means for defining derivation formula parameters for said derivation formula;

said derivation characteristic including a set of derivation formula parameter assignments that specify values for the derivation formula parameters.

8. A method for automatic value derivation in a database comprising:

defining a derived data item to a database management system;

defining a derivation formula independently of the derived data item to the database management system;

associating the derivation formula with the derived data item;

executing said derivation formula associated with said derived data item and generating a result of said derivation formula having been executed;

assigning the result of said derivation formula as a value of said derived data item;

defining a derivation characteristic to said database management system; and associating the derivation characteristic with said derived data item, said derivation characteristic including a derivation type used to indicate the conditions under which said database management system will execute said derivation formula associated with said derived data item;

said derivation type identifies said derived data item as being of a type to be derived by said database management system during retrieval of said value of said derived data item from said database.

9. The method of claim 8 further comprising:

detecting whether said value of said derived data item is a prescribed value signifying that said result of said derivation formula should be assigned as said value of said derived data item;

assigning the result of said derivation formula as said value of said derived data item only in the event said means for detecting determines that said value of said derived data item is the prescribed value.

10. A method for automatic value derivation in a database comprising:

defining a derived data item to a database management system;

defining a derivation formula independently of the derived data item to the database management system;

associating the derivation formula with the derived data item;

executing said derivation formula associated with said derived data item and generating a result of said derivation formula having been executed;

assigning the result of said derivation formula as a value of said derived data item;

defining a derivation characteristic to said database management system; and associating the derivation characteristic with said derived data item, said derivation characteristic including a derivation type used to indicate the conditions under which said database management system will execute said derivation formula associated with said derived data item;

said derivation type identifies said derived data item as being of a type to be derived by said database management system during insertion of said value of said derived data item into said database.

11. A method for automatic value derivation in a database comprising:

defining a derived data item to a database management system;

defining a derivation formula independently of the derived data item to the database management system;

associating the derivation formula with the derived data item;

executing said derivation formula associated with said derived data item and generating a result of said derivation formula having been executed;

assigning the result of said derivation formula as a value of said derived data item;

defining a derivation characteristic to said database management system; and associating the derivation characteristic with said derived data item, said derivation characteristic including a derivation type used to indicate the conditions under which said database management system will execute said derivation formula associated with said derived data item; and defining a derived user data type to said database management system as a template;

said associating said derivation characteristic with said derived data item including referring to the template for defaulting said derivation characteristic.

12. A method for automatic value derivation in a database comprising:

defining a derived data item to a database management system;

defining a derivation formula independently of the derived data item to the database management system;

associating the derivation formula with the derived data item;

executing said derivation formula associated with said derived data item and generating a result of said derivation formula having been executed;

assigning the result of said derivation formula as a value of said derived data item;

defining a derivation characteristic to said database management system; and associating the derivation characteristic with said derived data item, said derivation characteristic including a derivation type used to indicate the conditions under which said database management system will execute said derivation formula associated with said derived data item;

said defining of said derivation characteristic to said database management system includes defining a multiple value derivation formula indicator to said database management system, said multiple value derivation formula indicator indicating whether said derivation formula is capable of returning a set of result values.

13. A method for automatic value derivation in a database comprising:

defining a derived data item to a database management system;

defining a derivation formula independently of the derived data item to the database management system;

associating the derivation formula with the derived data item;

executing said derivation formula associated with said derived data item and generating a result of said derivation formula having been executed;

assigning the result of said derivation formula as a value of said derived data item;

defining a derivation characteristic to said database management system; and associating the derivation characteristic with said derived data item, said derivation characteristic including a derivation type used to indicate the conditions under which said database management system will execute said derivation formula associated with said derived data item; and defining derivation formula parameters for said derivation formula;

said derivation characteristic including a set of derivation formula parameter assignments that specify values for said derivation formula parameters.

14. A system for automatic value derivation in a database comprising:

a storage device for storing a database;

a processor coupled to the storage device, the processor including a database management system comprising:

means for defining a derived data item to the database management system;

means for defining a derivation formula independently of the derived data item to the database management system;

means for associating the derivation formula with the derived data item;

means for executing said derivation formula associated with said derived data item and for generating a result of said derivation formula having been executed; and means for assigning the result of said derivation formula as a value of said derived data item;

said derived data item being derived by said database management system during retrieval of said value of said derived data item from said database.

15. A system for automatic value derivation in a database comprising:
a storage device for storing a database;
a processor coupled to the storage device, the processor including a database management system comprising:
means for defining a derived data item to the database management system;
means for defining a derivation formula independently of the derived data item to the database management system;
means for associating the derivation formula with the derived data item;
means for executing said derivation formula associated with said derived data item and for generating a result of said derivation formula having been executed; and
means for assigning the result of said derivation formula as a value of said derived data item;
said derived data item being derived by said database management system during insertion of said value of said derived data item into said database.

16. A system for automatic value derivation in a database comprising:
a storage device for storing a database;
a processor coupled to the storage device, the processor including a database management system comprising:
means for defining a derived data item to the database management system;
means for defining a derivation formula independently of the derived data item to the database management system;
means for associating the derivation formula with the derived data item;
means for executing said derivation formula associated with said derived data item and for generating a result of said derivation formula having been executed; and
means for assigning the result of said derivation formula as a value of said derived data item;
means for defining a derivation characteristic to said database management system;
means for associating the derivation characteristic with said derived data item; and
means for defining a derived user data type to said database management system as a template;
said means for associating said derivation characteristic with said derived data item including means for referring to the template for the purpose of defaulting said derivation characteristic.

17. A system for automatic value derivation in a database comprising:
a storage device for storing a database;
a processor coupled to the storage device, the processor including a database management system comprising:
means for defining a derived data item to the database management system;
means for defining a derivation formula independently of the derived data item to the database management system;
means for associating the derivation formula with the derived data item;
means for executing said derivation formula associated with said derived data item and for generating a result of said derivation formula having been executed; and
means for assigning the result of said derivation formula as a value of said derived data item;
means for defining a derivation characteristic to said database management system; and
means for associating the derivation characteristic with said derived data item;
said means for defining a derivation characteristic to said database management system includes means for defining a multiple value derivation formula indicator to said database management system, said multiple value derivation formula indicator indicating whether said derivation formula is capable of returning a set of result values.

18. A system for automatic value derivation in a database comprising:
a storage device for storing a database;
a processor coupled to the storage device, the processor including a database management system comprising:
means for defining a derived data item to the database management system;
means for defining a derivation formula independently of the derived data item to the database management system;
means for associating the derivation formula with the derived data item;
means for executing said derivation formula associated with said derived data item and for generating a result of said derivation formula having been executed; and
means for assigning the result of said derivation formula as a value of said derived data item;
means for defining a derivation characteristic to said database management system; and
means for associating the derivation characteristic with said derived data item; and
means for defining derivation formula parameters for said derivation formula;
said derivation characteristic including a set of derivation formula parameter assignments that specify values for the derivation formula parameters.

19. A method for automatic value derivation in a database comprising:
defining a derived data item to a database management system;
defining a derivation formula independently of the derived data item to the database management system;
associating the derivation formula with the derived data item;
executing said derivation formula associated with said derived data item and generating a result of said derivation formula having been executed; and
assigning the result of said derivation formula as a value of said derived data item;
said derived data item being derived by said database management system during retrieval of said value of said derived data item from said database.

20. A method for automatic value derivation in a database comprising:
defining a derived data item to a database management system;
defining a derivation formula independently of the derived data item to the database management system;
associating the derivation formula with the derived data item;

executing said derivation formula associated with said derived data item and generating a result of said derivation formula having been executed; and assigning the result of said derivation formula as a value of said derived data item;

said derived data item being derived by said database management system during insertion of said value of said derived data item into said database.

21. A method for automatic value derivation in a database comprising:

defining a derived data item to a database management system;

defining a derivation formula independently of the derived data item to the database management system;

associating the derivation formula with the derived data item;

executing said derivation formula associated with said derived data item and generating a result of said derivation formula having been executed;

assigning the result of said derivation formula as a value of said derived data item;

defining a derivation characteristic to said database management system;

associating the derivation characteristic with said derived data item; and defining a derived user data type to said database management system as a template;

said associating said derivation characteristic with said derived data item including referring to the template for defaulting said derivation characteristic.

22. A method for automatic value derivation in a database comprising:

defining a derived data item to a database management system;

defining a derivation formula independently of the derived data item to the database management system;

associating the derivation formula with the derived data item;

executing said derivation formula associated with said derived data item and generating a result of said derivation formula having been executed; and assigning the result of said derivation formula as a value of said derived data item;

defining a derivation characteristic to said database management system; and associating the derivation characteristic with said derived data item;

said defining of said derivation characteristic to said database management system includes defining a multiple value derivation formula indicator to said database management system, said multiple value derivation formula indicator indicating whether said derivation formula is capable of returning a set of result values.

23. A method for automatic value derivation in a database comprising:

defining a derived data item to a database management system;

defining a derivation formula independently of the derived data item to the database management system;

associating the derivation formula with the derived data item;

executing said derivation formula associated with said derived data item and generating a result of said derivation formula having been executed;

assigning the result of said derivation formula as a value of said derived data item;

defining a derivation characteristic to said database management system;

associating the derivation characteristic with said derived data item; and defining derivation formula parameters for said derivation formula;

said derivation characteristic including a set of derivation formula parameter assignments that specify values for said derivation formula parameters.

* * * * *